US008482885B2

(12) United States Patent
Billingsley et al.

(10) Patent No.: US 8,482,885 B2
(45) Date of Patent: Jul. 9, 2013

(54) HYBRID SWITCH CIRCUIT

(75) Inventors: Richard J. Billingsley, Rossland (CA); Robert A. Dawley, Creedmoor, NC (US)

(73) Assignee: Electronic Systems Protection, Inc., Knightdale, NC (US)

( * ) Notice: Subject to any disclaimer, the term of this patent is extended or adjusted under 35 U.S.C. 154(b) by 594 days.

(21) Appl. No.: 12/559,027

(22) Filed: Sep. 14, 2009

(65) Prior Publication Data

US 2011/0063759 A1    Mar. 17, 2011

(51) Int. Cl.
*H02H 3/00* (2006.01)
*H02H 7/00* (2006.01)
*H02H 3/20* (2006.01)
*H02H 3/08* (2006.01)
*H02H 9/02* (2006.01)

(52) U.S. Cl.
USPC ...... 361/8; 361/78; 361/88; 361/90; 361/93.1

(58) Field of Classification Search
USPC ................ 361/2–13, 91.1, 93.1, 78, 88, 90
See application file for complete search history.

(56) References Cited

U.S. PATENT DOCUMENTS

| | | | |
|---|---|---|---|
| 4,414,601 A * | 11/1983 | Conroy, Jr. | 361/97 |
| 5,136,455 A | 8/1992 | Billingsley | |
| 5,528,131 A | 6/1996 | Marty et al. | |
| 5,721,661 A | 2/1998 | Mechanic | |
| 5,956,222 A * | 9/1999 | Wittner et al. | 361/115 |
| 6,040,969 A | 3/2000 | Winch et al. | |
| 6,229,682 B1 | 5/2001 | Mechanic | |
| 6,560,086 B2 | 5/2003 | Mechanic | |
| 6,728,089 B2 | 4/2004 | Harford | |
| 6,744,613 B2 | 6/2004 | McCook et al. | |
| 6,947,266 B1 | 9/2005 | Billingsley | |
| 6,956,725 B2 * | 10/2005 | Boughton et al. | 361/7 |
| 7,068,487 B2 | 6/2006 | Harford | |
| RE39,446 E | 12/2006 | Winch et al. | |
| 7,184,252 B2 | 2/2007 | Harford | |
| 7,511,934 B2 | 3/2009 | Benton et al. | |

(Continued)

FOREIGN PATENT DOCUMENTS

| | | |
|---|---|---|
| GB | 2185856 | 7/1987 |
| GB | 2284100 | 5/1995 |
| WO | 2008102147 A1 | 8/2008 |

OTHER PUBLICATIONS

Extended Search Report in counterpart European Application No. 11009944.7, mailed Sep. 28, 2012.

*Primary Examiner* — Rexford Barnie
*Assistant Examiner* — Christopher Clark
(74) *Attorney, Agent, or Firm* — Edell, Shapiro & Finnan, LLC

(57) ABSTRACT

A hybrid switch circuit includes a hybrid switch that couples an input conductor connected to an AC power supply to an output conductor connected to a load. The hybrid switch includes a power semiconductor in parallel with an electromagnetic relay. A control circuit turns on the hybrid switch by turning on the power semiconductor at a zero-voltage crossing of the AC voltage to provide a conductive path and then closing the relay to provide a conductive bypass path that bypasses the power semiconductor. The control circuit turns off the hybrid switch by opening the relay and subsequently turning off the power semiconductor at a zero crossing of the load current. The control circuit operates in response to a hybrid switch control signal that indicates whether an operating fault condition exists.

29 Claims, 13 Drawing Sheets

U.S. PATENT DOCUMENTS 7,541,696 B2 6/2009 Dawley
7,551,412 B2 6/2009 Winch
2007/0291432 A1* 12/2007 Ueda .......................... 361/91.1
2009/0139972 A1* 6/2009 Baker et al. ................... 219/201

* cited by examiner

HYBRID SWITCH CIRCUIT

BACKGROUND

Many available power protection devices, such as surge protection devices (SPDs) and hybrid filters, include an automatic switch circuit that disconnects power to the device output in response to various supply wiring fault and/or overvoltage conditions. As shown in FIG. 1, a conventional automatic switch circuit typically includes one or more electromagnetic relays (EMR) 10, a relay control circuit 12, an overvoltage circuit 14, and/or a wiring fault circuit 16 arranged in parallel between the supply line and neutral conductors.

Supply wiring faults, such as loss of AC ground continuity, can adversely affect the operation of both power protection devices and connected electronic equipment. Line voltage conditions, such as swells and overvoltages, can cause failure of certain power protection device components such as metal oxide varistors and other suppressor components. In addition, some equipment power supplies can be damaged by continuous overvoltage conditions.

In conventional automatic switch circuits that include a wiring fault circuit 16, continuity and correct polarity of the supply line, neutral, and ground conductors are typically required before the wiring fault circuit 16 permits the relay control circuit 12 to energize the relay (i.e., generate the necessary relay coil voltage to close the normally-open relay contacts). The relay contacts are typically configured to make/break continuity of the device line and/or neutral conductor. FIG. 1, for example, shows a relay 10 configured to make/break line continuity. Energizing the relay 10, therefore, makes continuity of the line conductor, thereby passing AC power to the device output and connected equipment. With a supply wiring fault condition (i.e., loss of continuity of any of the supply conductors and/or a reverse polarity at the branch outlet), the wiring fault circuit 16 will signal the relay control circuit 12 to remove relay coil voltage, causing the normally-open relay contacts to open, thereby disconnecting AC power to downstream device components and connected equipment. Designed correctly, automatic switch circuits that include a wiring fault circuit ensure that the branch outlet to which the device is connected is wired correctly before power is passed to the device output and connected equipment. Because wiring faults can affect operation of both the power protection device and connected equipment, ensuring a properly wired supply can be critical to the reliable operation of the electronic system (power protection device and connected equipment).

In addition to the wiring fault circuit 16, many prior art automatic switch circuits include an overvoltage circuit 14 that requires nominal line voltage levels before AC power is passed to the device output and connected equipment. In response to a line voltage condition, such a swell or overvoltage, the overvoltage circuit 14 will signal the relay control circuit 12 to remove relay coil voltage, causing the normally-open relay contacts of relay 10 to open, thereby disconnecting AC power to downstream components and connected equipment. Once the swell or overvoltage condition has subsided, the overvoltage circuit 14 will signal the relay control circuit 12 to energize the relay 10, causing the normally-open contacts to close, thereby passing AC power to downstream device components and connected equipment. Designed correctly, automatic switch circuits that include an overvoltage circuit can protect vulnerable downstream device components (e.g., metal oxide varistors (MOVs) and other suppressor components) from swell and overvoltage related damage. In addition to protecting vulnerable device components, these circuits can also protect connected equipment that might otherwise be damaged by the swell or overvoltage condition.

There are, however, limitations in conventional automatic switch circuits related to the sole use of electromagnetic relays (EMRs) for AC switching and the associated relay control circuits. Electromagnetic relays are mechanical devices that include a multi-turn coil wound on an iron core (electromagnet), an armature, a spring, and one or more sets of contacts. Voltage across the multi-turn coil creates current flow in the coil that causes the iron core to become magnetized, thereby attracting the pivoting armature and closing the normally-open contacts. As coil voltage drops, so does current flow and core magnetic force. When the coil current drops to a level where the attractive force of the core is less than the resistive force of the spring, the armature will swing open and the relay contacts will return to their normally-open position.

Because of the mechanical nature of electromagnetic relays, there is a significant delay (turn-on response time) between application of sufficient relay coil voltage and closure of the normally-open contacts. Similarly, there is a significant delay (turn-off response time) between removal of relay coil voltage and opening of the relay contacts. These turn-on and turn-off relay response times are significantly affected by coil voltage, coil temperature, and age and history of the relay. Specifications from one relay supplier, for instance, show a turn-on response time of 8 milliseconds at an applied coil voltage of 80% of the rated coil voltage and a turn-on response time of 2 milliseconds at an applied coil voltage of 150% of the rated coil voltage. The above response time/coil voltage relationship along with variations in relay coil resistance with coil temperature and changes in the relay spring characteristics over time mean significant variations in relay turn-on and turn-off response times.

Because of this response time variation, turn-on and turn-off of electromagnetic relays cannot be accurately controlled and, for practical purposes, are random with respect to the line voltage. Turn-on of a relay coincident with the peak of the line voltage can result in significant inrush currents ($I=C*dV/dt$) into capacitive loads (i.e., charging of capacitors in connected equipment DC power supplies). This inrush current can result in transients that can affect both connected and nearby equipment. Turn-off of the relay coincident with the peak of the connected equipment load current can also produce transients ($V=L*di/dt$) that can affect both connected and nearby equipment.

In addition to the transients resulting from random turn-on and turn-off of the electromagnetic relay, transients and noise are also produced as a result of contact bounce. Contact bounce results when the relay coil is energized causing the normally open contacts to come together and bounce off each other several times before finally coming to rest in a closed position. Similar to the contact bounce associated with turn-on of the relay, contact bounce can also occur when the relay is turned off. Associated with turn-on and turn-off contact bounce is arcing between contacts as they come close together or start to separate. The amount of arcing depends on both the supply (i.e., line voltage) and load conditions (i.e., load current). With contact bounce occurring coincident with the peak of the line voltage, contact arcing can be significant, causing pitting of the contacts and a reduction of the effective lifetime of the relay.

The use of electromagnetic relays in conventional automatic switch circuits, therefore, results in the following: random turn-on related transients; random turn-off related transients; contact bounce related noise and transients; and reduced relay lifetime as a result of contact arcing.

With regard to overvoltage circuits, some conventional automatic switch circuits include an overvoltage circuit that controls the relay control circuit to turn off the electromagnetic relay in response to swell and overvoltage conditions. In addition to one or more resistors, capacitors, diodes, and Zener diodes, conventional overvoltage circuits typically rely on one or more discrete solid state switching devices (e.g., bipolar transistors, SCRs, etc.) to control the relay control circuit to turn on and off the electromagnetic relay. As will be explained, the problem with such conventional overvoltage circuits is the variation in performance (cut-out voltage) resulting from ambient and component temperature changes.

FIG. 2 shows a typical overvoltage circuit which is used to illustrate these problems. In this circuit, resistor R101 and R102 are connected in series between the line and neutral conductors, and capacitor C101 and diode D101 are connected in series along a path parallel to resistor R101. The emitter of a bipolar transistor Q101 is coupled to the line conductor and the collector of transistor Q101 is coupled to ground via serially-connected resistor R104 and diode D102 and serves as an output to the relay control circuit. The base of transistor Q101 is coupled to a node between capacitor C101 and diode D101 via serially-connected resistor R103 and Zener diode Z101. The relay control circuit includes SCR Q102, capacitor C102, resistor R105, and diode D103 connected in series between the line and neutral conductors. The output of the overvoltage circuit (from the collector of transistor Q101) serves as the gate drive current for SCR Q102. Capacitor C102 is connected in parallel with the relay coil of a relay K101 with normally open contacts arranged in-line with the line conductor between the supply and load.

Resistors R101 and R102, diode D101, and capacitor C101 are configured as a line-to-neutral connected, unregulated, half-wave rectifier with a DC voltage across capacitor C101 that is directly proportional to the line voltage (line-to-neutral voltage). Under nominal line voltage conditions, the voltage across capacitor C101 is less than the reverse breakdown voltage of Zener diode Z101. As such, there will be no base drive to transistor Q101. With transistor Q101 off, gate drive to SCR Q102 is created through diode D102 and resistor R104. With the SCR Q102 on, the relay control circuit is connected across the line/neutral pair and relay coil voltage is produced across capacitor C102. If sufficient, this relay coil voltage will cause the normally-open relay contacts of relay K101 to close, thereby passing power to connected equipment.

As the line voltage rises (i.e., in the case of a swell or overvoltage condition), so does the voltage across capacitor C101. When the voltage across capacitor C101 exceeds the reverse breakdown voltage of Zener diode Z101, then current through resistor R103 will result (i.e., transistor Q101 base drive current). The amount of transistor Q101 base drive current will depend on the extent of the swell or overvoltage condition. When the line voltage is such that the voltage across capacitor C101 just exceeds the reverse breakdown of Zener diode Z101, then the resulting base drive current will be relatively low. As the line voltage increases, so does the base drive current to transistor Q101. With this circuit configuration, transistor Q101 operates more like an amplifier than an on/off switch. As base drive to transistor Q101 increases, so does the transistor Q101 collector current. As the transistor Q101 collector current increases, the gate drive current to SCR Q102 decreases. As SCR Q102 gate drive current drops, the phase controlled configured SCR Q102 will be on for a shorter proportion of each line voltage half cycle which will cause the relay coil voltage to drop. This type of discrete semiconductor overvoltage circuit, typical of conventional designs, functions by lowering the relay coil voltage as the line voltage increases beyond the point at which the Zener diode Z101 first starts to conduct. At a certain line voltage (cut-out voltage), the relay coil voltage drops to a point where the relay core magnetic force is insufficient to keep the normally-open relay contacts closed, and the relay contacts open.

If circuit values of the various components remained constant, this circuit approach would provide a consistent response to swell and overvoltage conditions. Circuit values are not constant, however, and can vary significantly with changes in component temperature, for example. The relay coil resistance, for instance, can vary by more than 20% as the relay temperature rises from 25° C. to 50° C. Because the coil resistance determines the coil current (and relay core magnetic force) for a given relay coil voltage, changes in coil resistance can dramatically affect the relay coil voltage necessary to maintain the normally-open relay contacts in a closed state. As a result, changes in ambient and component temperature can significantly affect the operation of such discrete semiconductor overvoltage circuits. Testing of these types of circuits shows significant changes in cut-out voltage (10% reduction) as the temperature of the relay rises from room temperature to full-load temperature (i.e., the temperature that the relay rises to after one hour at full resistive load).

The problem with this degree of temperature related cut-out voltage variation is that, if the device in question heats up as a result of continuous full load, the cut-out voltage could drop to a level where nuisance tripping (turning off) of connected equipment could result. For devices that are designed to improve connected equipment uptime, these types of overvoltage circuits represent a significant limitation.

SUMMARY

Described herein is a hybrid switch circuit for coupling an AC power supply to a load. The circuit includes a hybrid switch that couples an input conductor connected to the AC power supply to an output conductor connected to the load. The hybrid switch comprises one or more power semiconductors, such as a triac or power MOSFETs, in parallel with an electromagnetic relay. When switched on, the power semiconductor provides a conductive path for the AC voltage between the input and output conductors. When closed, the relay provides a conductive path between the input and output conductors that bypasses the power semiconductor. A control circuit switches the hybrid switch from a non-conductive state to a conductive state by switching on the power semiconductor at a zero-voltage crossing of the AC voltage and subsequently closing the relay. The control circuit switches the hybrid switch from a conductive state to a non-conductive state by opening the relay and subsequently turning off the power semiconductor at a zero crossing of the load current. By first switching on the power semiconductor at a zero-voltage crossing of the AC supply voltage, a rapid connection is achieved without excessive in-rush current. Subsequent closing of the relay avoids contact bounce and arcing and provides a low steady-state resistance in the conductor by bypassing the power semiconductor.

The hybrid switch can be controlled in response to observations about certain operating conditions that, when compared to predefined operating limits, indicate whether or not a fault condition exists. A hybrid switch control circuit can include one or more condition sensing circuits that indicate conditions outside pre-defined operating limits such as over-voltage, under-voltage, over-current, and over-temperature conditions as well as various wiring fault conditions. Each of these condition sensing circuits employs an operational amplifier that compares a temperature-stable reference voltage to a signal indicating an operating condition, and the result of this comparison indicates whether a fault condition exists. The outputs of a number of such condition sensing circuits can be connected in a wired-AND configuration to generate a single hybrid switch control signal that controls the state of the hybrid switch, whereby if any of the condition sensing circuits indicates a fault condition, the hybrid switch is switched to a non-conductive state to protect downstream device components and connected equipment.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

A technique used to minimize transients and noise as a result of on/off switching is to switch on the AC supply only when the line voltage is at a zero crossing and to switch off the AC supply only when the load current is at a zero crossing (zero cross switching). Zero cross switching requires the use of a solid-state power switching device such as a triac and a zero cross gate drive circuit.

The problem with using a triac in a power protection device is the significant on-state voltage drop (>1 volt) across the main triac terminals (i.e., the load current carrying terminals). Under full load conditions (about 15 amps), the power dissipation of the triac is significant (>15 watts). In order to limit the temperature rise of the triac under these conditions, large heat sinks, ventilated enclosures, and forced air methods would typically be required, measures that are usually cost prohibitive in power protection devices.

In order to achieve zero-cross switching without the significant on-state voltage and power dissipation associated with solid-state switching devices such as triacs, the circuit described herein uses a hybrid switch circuit involving a parallel combination of a power semiconductor, such as a triac, and an electromagnetic relay. With this configuration, zero cross switching can be realized with minimal on-state voltage drop and power dissipation.

Figure 1:
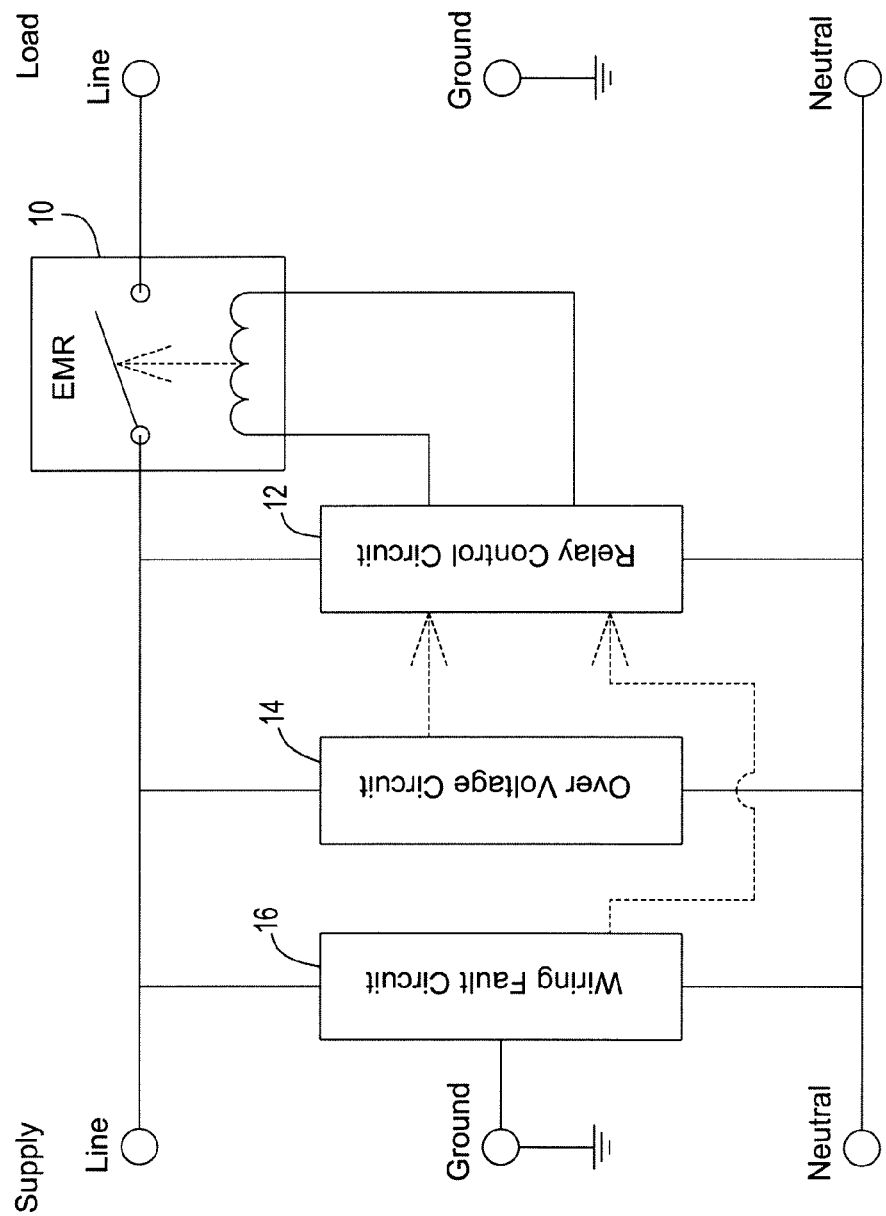
FIG. 1 is a diagrammatic illustration of a conventional automatic switch device for controlling a relay.
Figure 2:
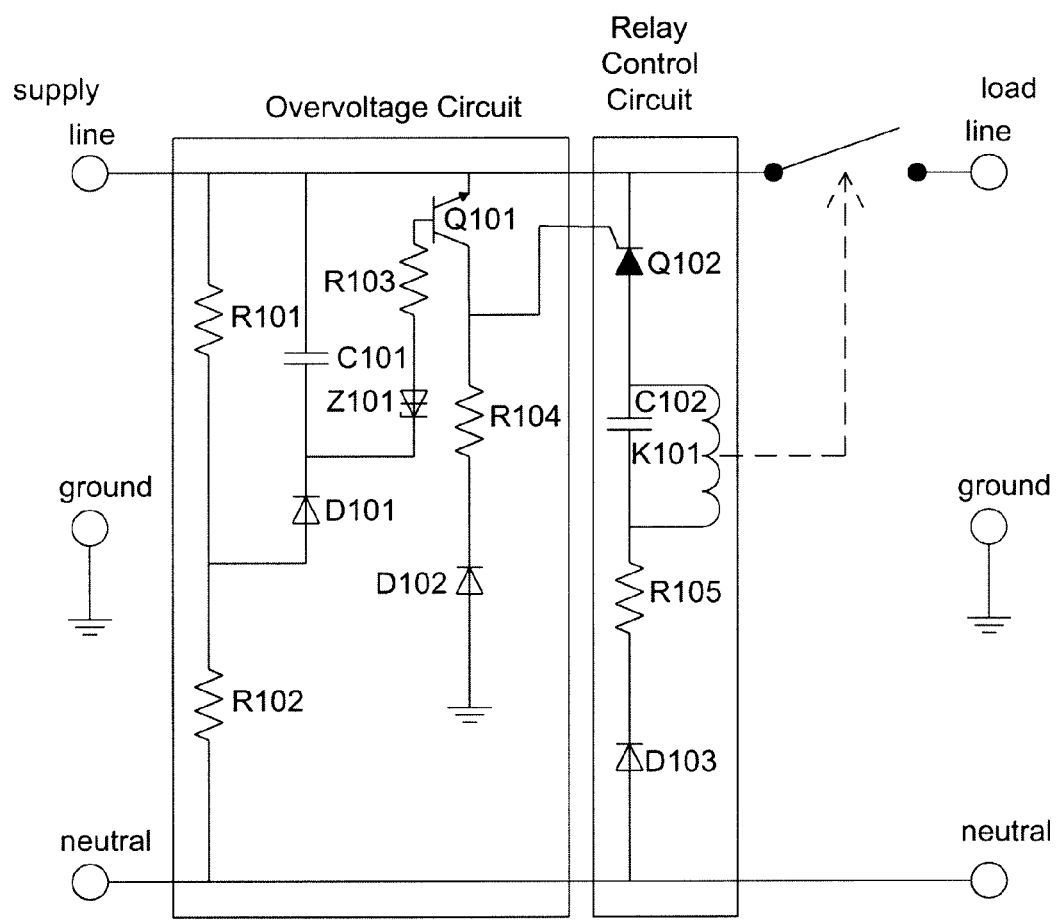
FIG. 2 is schematic illustration of a generic, conventional overvoltage circuit for controlling a relay control circuit.
Figure 3:
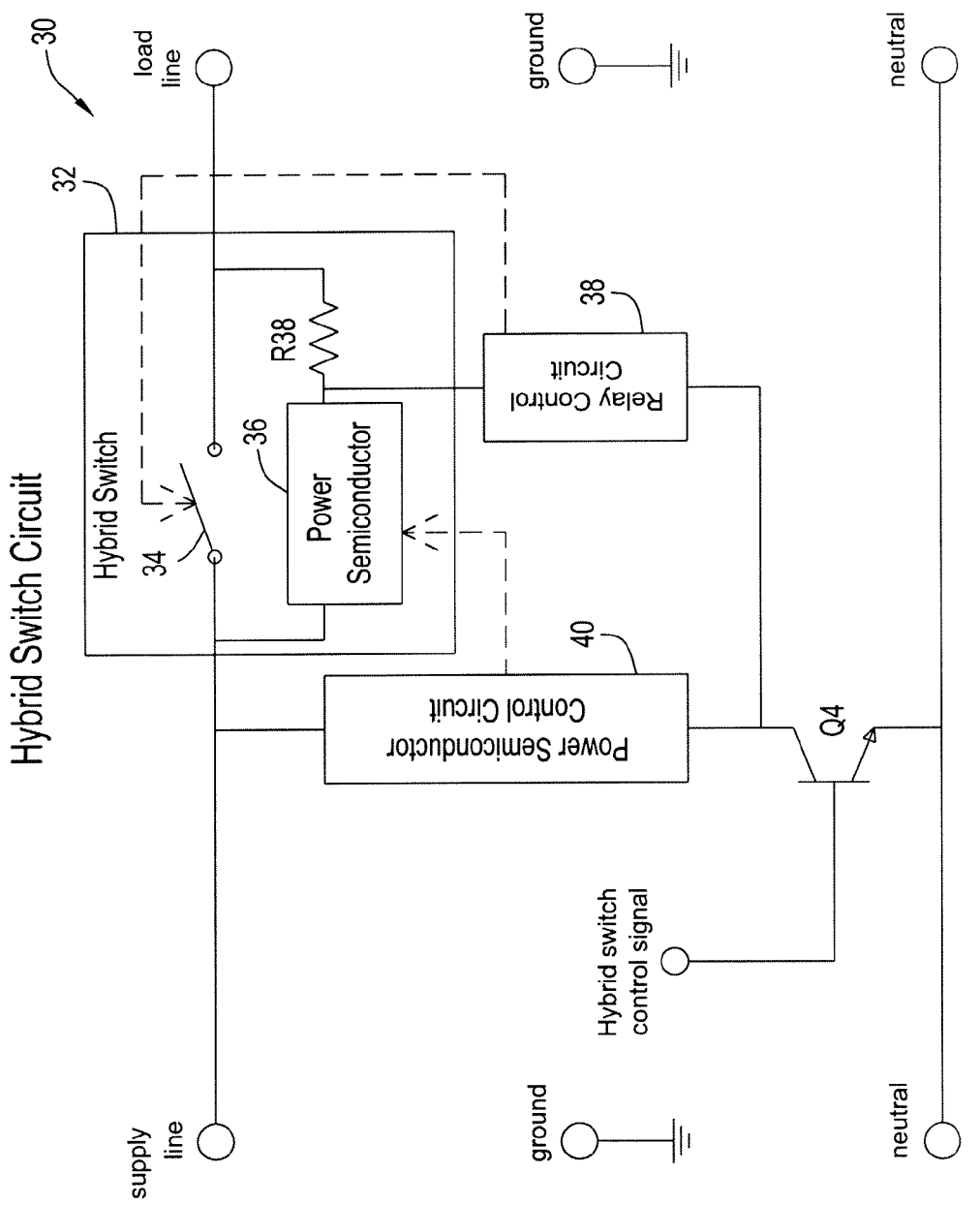
FIG. 3 is a diagrammatic illustration of a hybrid switch circuit for selectively coupling an AC power supply system to load equipment.

FIG. 3 illustrates a circuit diagram of a hybrid switch circuit 30 of a power protection device at a conceptual level. On the supply side, input line, neutral, and ground terminals are configured to be coupled to corresponding terminals of an AC power supply system. On the load side, output line, neutral, and ground terminals are configured to be coupled to corresponding terminals of one or more load devices. Line and neutral conductors of the device provide paths between the input and output line and neutral terminals, respectively. In particular, a hybrid switch 32 is disposed along the line conductor path and selectively couples an input (supply) line conductor to an output (load) line conductor between the input and output line terminals. Hybrid switch 32 includes an electromagnetic relay 34 in-line with the input and output line conductors and a power semiconductor 36, such as a triac or power MOSFETs, and series resistor R38 arranged in parallel with relay 34. Relay 34 is controlled by a relay control circuit 38 that is coupled on one end to the line conductor between the power semiconductor and resistor R38 (i.e., along the line path downstream (load side) of the power semiconductor. Power semiconductor 36 is controlled by a switching device control circuit 40 that is coupled on one end to the input line conductor (i.e., along the line path upstream (supply side) of hybrid switch 32). The emitter of a bipolar junction transistor Q4 is coupled to the neutral conductor, and the collector of transistor Q4 is coupled to the other ends of relay control circuit 38 and switching device control circuit 40. The base of transistor Q4 receives a hybrid switch control signal that controls the state of hybrid switch 32.

As used herein, the term power semiconductor refers to semiconductor devices useable as switches in power electronic circuits, including the following devices: thyristors (triacs, silicon controlled rectifiers (SCRs), MOS controlled Thyristors (MCTs)); bipolar junction transistors; integrated gate bipolar transistors (IGBTs); and power metal oxide semiconductor field effect transistors (MOSFETs). Power semiconductors are suitable for switching connected equipment loads such as photocopiers (e.g., devices that operate in the amp range) and are to be distinguished from low power semiconductors (e.g., semiconductor devices that operate in the milliamp range).

In operation, when the hybrid switch control signal indicates that the input and output line conductors are to be connected, thereby supplying power from the AC power supply to the load, switching device control circuit 40 causes power semiconductor 36 to turn on at a zero crossing of the AC line voltage. After power semiconductor 36 has been turned on, relay control circuit 38 causes relay 34 to close, thereby directly connecting the input and output line conductors and bypassing power semiconductor 36. By using hybrid switch circuit 30 (i.e., the parallel combination of power semiconductor 36 and electromagnetic relay 34 and associated control circuits), zero voltage turn-on is achieved with minimal on-state voltage drop and power loss.

When the hybrid switch control signal indicates that the input and output line conductors are to be disconnected, to achieve zero current turn off of hybrid switch 32, relay control circuit 38 first causes relay 34 to open, such that the line signal passes through power semiconductor 36. Subsequently, switching device control circuit 40 causes power semiconductor 36 to turn off at a zero crossing of the load current.

By using the hybrid switch circuit 30 (i.e., the parallel combination of a power semiconductor and an electromagnetic relay and associated control circuits), zero voltage turn-on is achieved with minimal on-state voltage drop and power loss. The solid-state switching device has a fast response time and provides the zero-cross turn on/off feature which prevents conditions that result in significant equipment inrush currents. The power semiconductor does consume considerable power and generates significant heat with the full load current passing through it. However, due to operation of the electromagnetic relay, the power semiconductor carries the full load current for only a limited time. When closed, the relay essentially bypasses the power semiconductor and provides a very low on-state resistance resulting in low power consumption and low heat generation.

Figure 4:
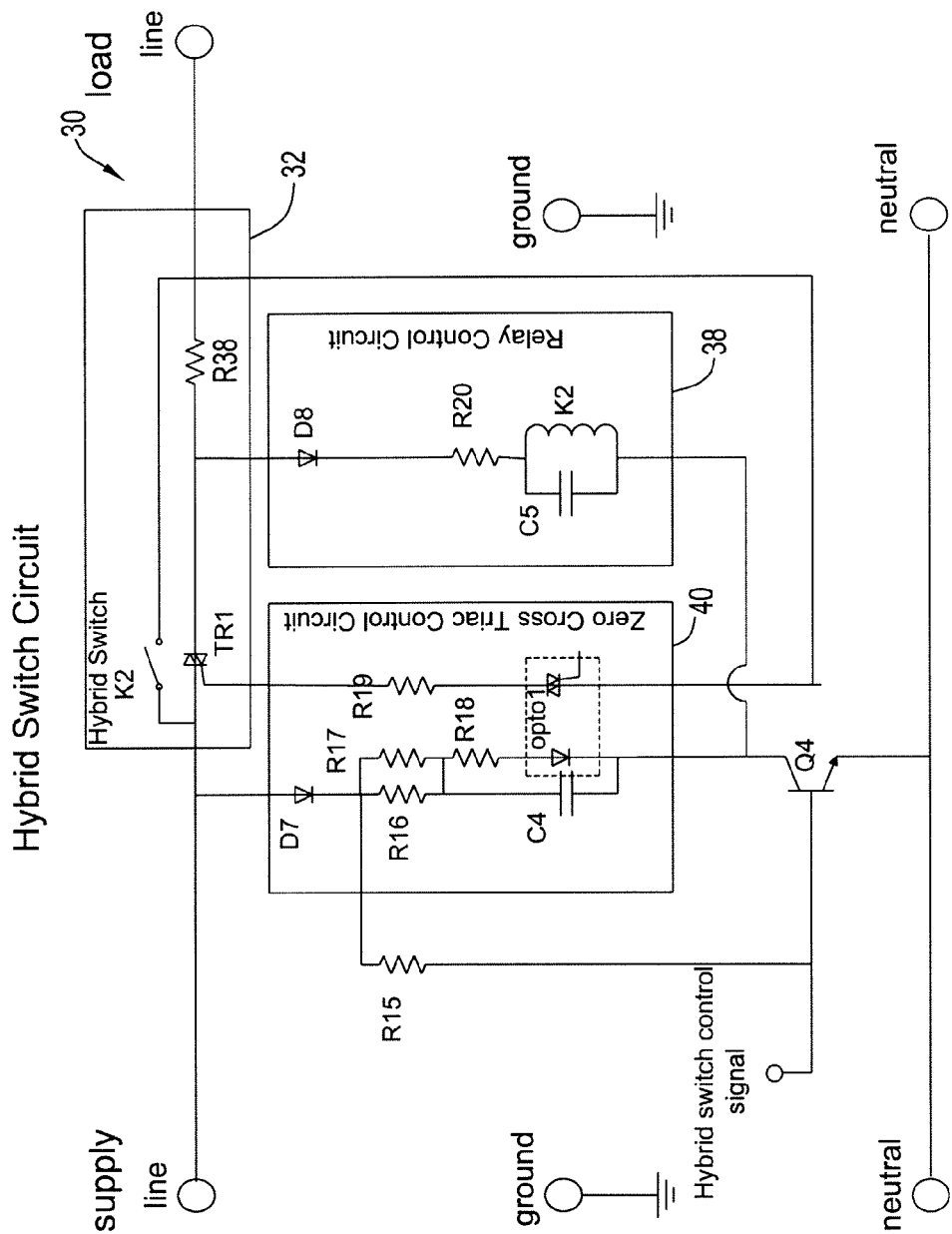
FIG. 4 is a schematic illustration of an embodiment of a hybrid switch circuit.

An example of one possible implementation of the hybrid switch circuit is shown in the schematic circuit diagram of FIG. 4. In particular, hybrid switch 32 comprises a triac TR1 serving as the power semiconductor in series with a current limiting resistor R38, with the combination arranged in parallel with an electromagnetic relay K2.

Switching device control circuit 40 is implemented in the circuit of FIG. 4 with a zero cross triac control circuit which includes a diode D7 connected between input line conductor (on the supply side of hybrid switch 32) and a first node. A resistor R15 is connected between the first node and the base of transistor Q4. Resistors R16 and R17 are connected in parallel between the first node and a second node. A capacitor C4 is connected between the second node and the collector of transistor Q4. A resistor R18 and the input side of an optocoupler (opto1) are connected in series between the second node and the collector of transistor Q4 (i.e., in parallel with capacitor C4). The output side of optocoupler opto1 comprises a photo triac that is connected in series with a resistor R19 between the output line conductor and the gate of triac TR1 of hybrid switch 32 (i.e., one terminal of resistor R19 is coupled to the output of optocoupler opto1 and the other terminal of resistor R19 provides the output triac control signal).

Relay control circuit 38 includes a diode D8, a resistor R20, and a capacitor C5 arranged serially along a path between the triac and current limiting resistor and the collector of transistor Q4. The relay coil of relay K2 is arranged in parallel with capacitor C5.

To achieve zero voltage turn-on with minimal on-state voltage drop and power loss, triac TR1 is turned on at a zero crossing of the AC line voltage, followed by turn on of the electromagnetic relay K2. With the relay contacts in parallel with the main triac TR1 terminals (and resistor R38), on-state voltage drop and power loss are very much reduced compared with a triac-only switch. Turn on of the triac before the electromagnetic relay is ensured by having the relay control circuit (D8, R20 and C5) connected on the load side of triac TR1. With this configuration, triac TR1 must be on before line voltage is passed to the relay control circuit which generates the necessary coil voltage required to close the normally-open relay contacts of relay K2.

Zero voltage turn on of of triac TR1 is achieved by operation of zero cross triac control circuit 40. With zero cross triac control circuit 40 connected across the line/neutral pair (i.e., transistor Q4 in an "on" state), a DC voltage is produced across capacitor C4. This DC voltage produces a current through resistor R18 and the input side of the optocoupler (opto1). Opto1 can be a zero-cross phototriac driver optocoupler such as a Fairchild MOC3063. Zero-cross optocouplers contain internal circuitry that generates a trigger pulse at each zero crossing of the line voltage and require both input current and a zero-cross trigger pulse to turn on the output phototriac. While application of optocoupler input current is random with respect to the line voltage, generation of the zero-cross trigger pulse is synchronized with the line voltage (i.e., it occurs at each zero-crossing), ensuring zero cross turn on of the optocoupler output triac. With the optocoupler output triac turned on, gate current to main triac TR1 is created through resistor R19, thereby turning on triac TR1. Because of the fast response time of the optocoupler output triac and main triac TR1, and the requirement of both the optocoupler input current and a line voltage synchronized zero-cross trigger pulse, the main triac TR1 will turn on very close to each zero crossing of the line voltage.

As explained previously, once the main triac TR1 turns on, power is passed to relay control circuit 38 which creates the necessary relay coil voltage to turn on relay K2. Once relay K2 closes, the AC line signal bypasses triac TR1 (as well as resistor R38), minimizing on-state voltage drop and power loss while still achieving the desired zero voltage turn-on.

It should be noted that transistor Q4 is controlled (i.e., turned on and turned off) by the hybrid switch control signal that is generated by a hybrid switch control circuit. The hybrid switch control circuit may include one or more of the following optional condition sensing circuits: an overvoltage circuit; an under-voltage circuit; an over-temperature circuit; a wiring fault circuit; and an over-current circuit, each of which is described below in greater detail.

To achieve zero current turn off of hybrid switch 32, relay K2 is turned off first followed by turn off of triac TR1 at a zero crossing of the load current. Turn off of relay K2 followed by turn off of triac TR1 is achieved by designing a much shorter discharge time constant in relay control circuit 38 than in zero cross triac control circuit 40. The discharge time constant of relay control circuit 38 is a function of the values of capacitor C5 and the relay coil resistance. The discharge time constant of zero cross triac control circuit 40 is a function of the values of resistor R18 and capacitor C4. Proper selection, therefore, of capacitor C5, resistor R18, and capacitor C4 ensures that the discharge time constant of relay control circuit 38 is much shorter than the discharge time constant of the zero cross triac control circuit 40.

When transistor Q4 is turned off by the hybrid switch control signal from the hybrid switch control circuit, both zero cross triac control circuit 40 and relay control circuit 38 are disconnected from across the line/neutral supply pair. With line voltage removed from relay control circuit 38, capacitor C5 will discharge through the relay coil of relay K2. Once the voltage across capacitor C5 drops below the must-release level, the relay contacts of relay K2 will open. With line voltage removed from zero cross triac control circuit 40, capacitor C4 will discharge through resistor R18 and the input side of optocoupler opto1. When capacitor C4 discharges to the point that the input current drops below the optocoupler input trigger current level, the optocoupler output triac will turn off. When this occurs, gate current will be removed and main triac TR1 will turn off. With a much shorter discharge time constant, capacitor C5 will discharge much quicker than capacitor C4, and relay K2 will turn off before main triac TR1.

Turn off of the main triac at a zero cross of the load current is an inherent characteristic of thyristor devices (e.g., triacs, SCRs, etc). When gate current is removed, the triac will stay on until the main terminal current drops to a very low level (i.e., below the holding current level for the device). In AC supply circuits, turn off of the triac will occur when the load current drops to a very low level (i.e., very close to a zero crossing of the load current).

Use of the hybrid switch circuit shown in FIGS. 3 and 4 ensures zero voltage turn on and zero current turn off with minimal steady-state voltage drop and power dissipation. Compared with conventional designs that rely on an electromagnetic relay for switching, the hybrid switch circuit described will result in much lower levels of switch related noise and transients, since the relay opens and closes only while the parallel-connected power semiconductor is on (conducting). In addition, because the solid-state switching device turns on first (significantly lowering the voltage across the relay contacts) followed by turn on of the relay, arcing across the relay contacts associated with turn on contact bounce is significantly reduced. Similarly, because the relay turns off before the solid-state switching device, arcing across the relay contacts associated with turn off contact bounce is also significantly reduced. The hybrid switch circuit, therefore, reduces contact bounce related arcing which will increase the lifetime of the relay compared with automatic switch circuits based solely on an electromagnetic relay. While the hybrid switch shown in FIGS. 3 and 4 is arranged to make/break the connection between the input and output line conductors, optionally, a hybrid switch controlled in the same manner could be arranged between input and output neutral conductors or hybrid switches could be place in both the line and neutral paths.

Figure 5:
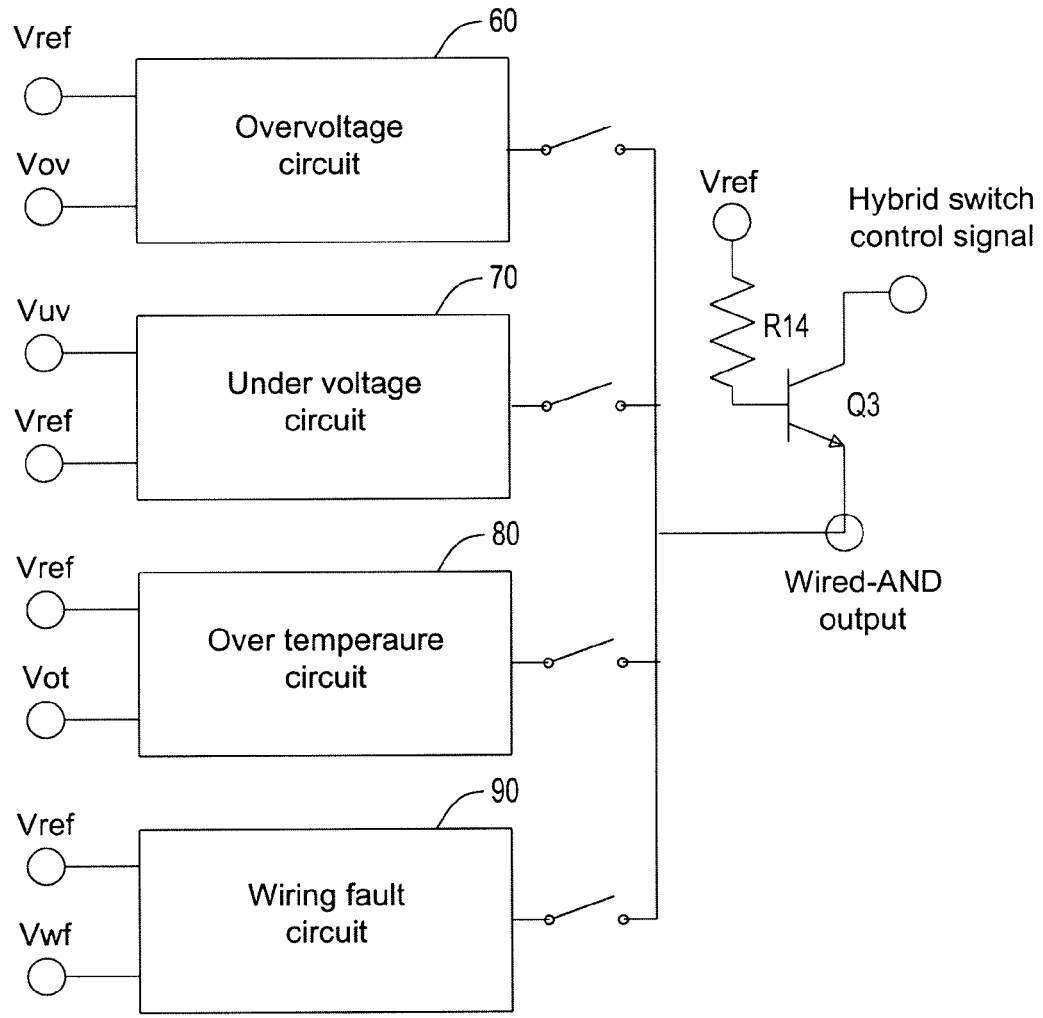
FIG. 5 is a block diagram of a hybrid switch control circuit for generating a control signal for controlling the hybrid switch circuit in accordance with operating conditions.

FIG. 5 is a block diagram conceptually illustrating a hybrid switch control circuit for controlling the hybrid switch circuit (i.e., turning the hybrid switch on or off) by generating an appropriate hybrid switch control signal. The hybrid switch control circuit can include one or a combination of the following optional condition sensing circuits that will be separately explained below: an overvoltage circuit 60, an under-voltage circuit 70, an over-temperature circuit 80, and a wiring fault circuit 90. Optionally, an over-current circuit (not shown in FIG. 5) can also be used to provide a control signal to the hybrid switch circuit, as described below.

As will be explained below in greater detail, each of these condition sensing circuits uses an operational amplifier, con-figured as a comparator, whose output depends on the difference between the amplitude of a signal of interest and a stable reference voltage $V_{ref}$. In particular, overvoltage circuit 60 receives a reference voltage $V_{ref}$ and an overvoltage indicator signal $V_{ov}$; under-voltage circuit 70 receives reference voltage $V_{ref}$ and an under-voltage indicator signal $V_{uv}$; over-temperature circuit 80 receives reference voltage $V_{ref}$ and an over-temperature indicator signal $V_{ot}$; and wiring fault circuit 90 receives reference voltage $V_{ref}$ and a wiring fault indicator signal $V_{wf}$. Each of these circuits can be realized on their own using a discrete operational amplifier, or a combination of the above circuits can be implemented in a simplified manner by using a quad comparator IC such as the LM339, a 14-pin IC that includes four open collector output comparators. Using the quad comparator reduces the IC count when more than one of the above optional circuits is required. The open collector output allows the comparator outputs to be wired together in a wired-AND configuration (when one or more of the outputs goes low, the wired-AND output goes low). The wired-AND configuration eliminates the need for an additional AND gate, again reducing the overall IC count. Nevertheless, another option is to connect the comparator outputs via one or more AND gates, and the invention is not limited to a wired-AND configuration. As can be seen in FIG. 5, customization of the hybrid switch control circuit can be achieved through the use of jumpers or switches that select/de-select individual condition sensing circuits from the wired-AND output. As can also be seen in FIG. 5, the wired-AND output is used to control a switching device, such as a bipolar transistor, to create the hybrid switch control signal which, in turn, controls the hybrid switch circuit. In particular, the wired-AND output is coupled to the emitter of a bipolar transistor Q3, the reference voltage $V_{ref}$ is supplied to the base of transistor Q3 through a resistor R14, and the hybrid switch control signal is provided at the collector of transistor Q3. The wired-AND output can be in one of two binary states (either low or high) and nothing in between. Because of this, the transistor that uses this signal (and additionally the transistor used in the hybrid switch circuit) is forced to operate as an on/off switch. Operating these transistors as on/off switches creates a much more consistent circuit response that is much less influenced by ambient and component temperature changes than conventional designs that rely on amplifier-configured, discrete transistors.

Figure 6:
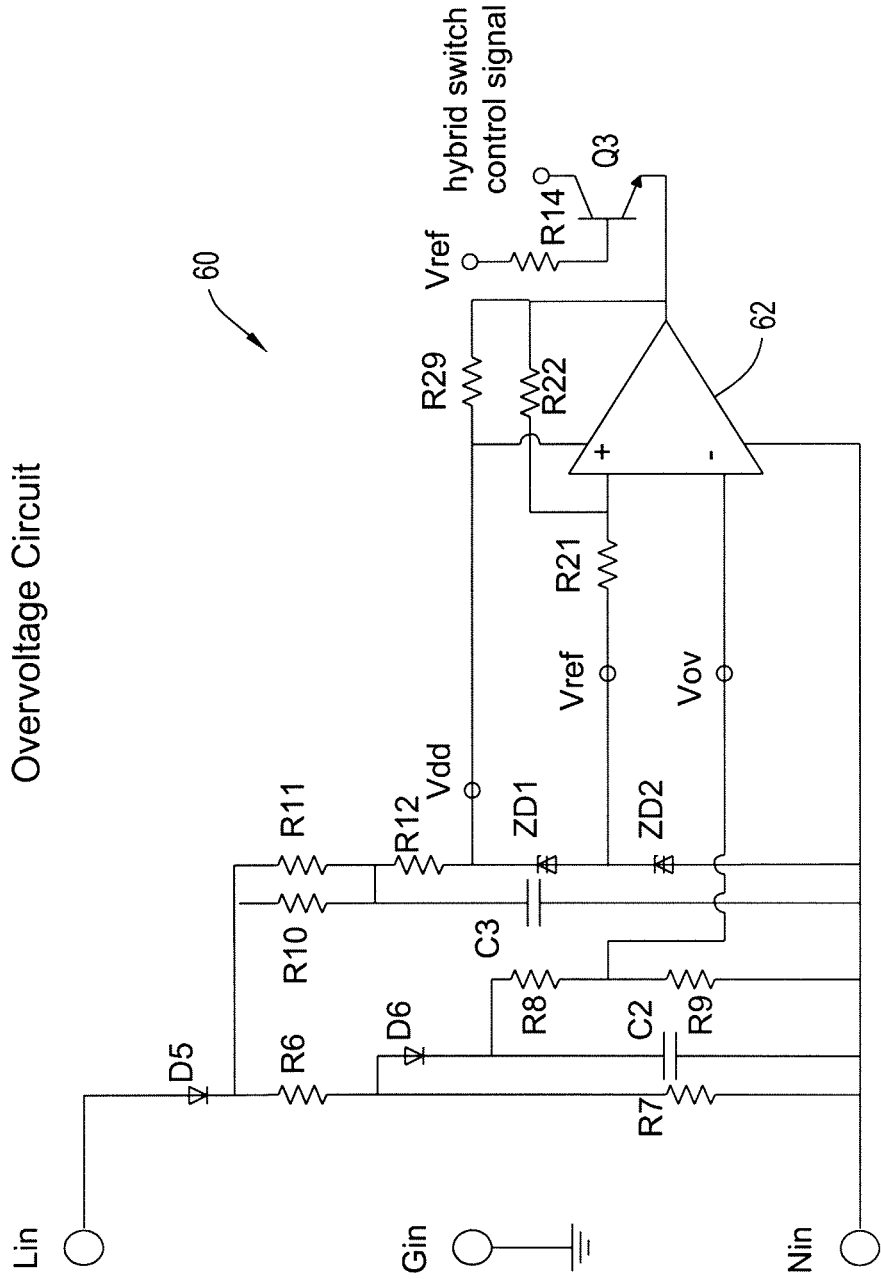
FIG. 6 is a schematic illustration of an embodiment of an overvoltage circuit.

Implementations of the overvoltage, under-voltage, wiring fault, over-temperature, and over-current circuits are now described in detail. The term "fault condition" is used here generally to refer to any type of unacceptable operating condition that is detected by a condition sensing circuit (e.g., an overvoltage, under-voltage, over-temperature, wiring fault, or over-current condition), which may warrant disconnecting load equipment and/or protecting components in the power protection device itself. FIG. 6 is a schematic illustration of an embodiment of overvoltage circuit 60 shown conceptually in FIG. 5. As previously explained, the problem with conventional overvoltage circuits is the inconsistent performance (i.e., significant change in cut-out voltage) as a result of changes in ambient and component temperature. The objective with this overvoltage circuit design, therefore, is a more consistent overvoltage response across the expected ambient and component temperature range.

Overvoltage circuit 60 shown in FIG. 6 uses an operational amplifier (op amp) 62 configured as a comparator to compare an overvoltage signal with a stable reference voltage. Op amp 62 is configured with positive feedback to ensure more consistent and immediate op amp output transitions. The op amp output is used to control the switch-configured transistor Q3 to create a switch control signal which in turn controls the hybrid switch circuit. In this manner, a more consistent and stable response to overvoltage conditions can be realized.

Overvoltage circuit 60 requires a DC voltage (overvoltage signal $V_{ov}$) with an amplitude that is directly proportional to the AC line voltage, which indicates an operating condition (in this case the AC supply voltage level). The overvoltage signal $V_{ov}$ is produced by the line-to-neutral connected, unregulated, half-wave rectifier circuit comprising: diodes D5 and D6, resistors R6, R7, R8, and R9, and capacitor C2. In particular, diode D5, resistor R6, and resistor R7 are connected in series between the input line conductor (on the supply side of the hybrid switch) and the neutral conductor. Diode D6 and capacitor C2 are arranged in series and are connected in parallel with resistor R7 (i.e., diode D6 and capacitor C2 are connected in series between a node between resistors R6 and R7 and the neutral conductor). Resistors R8 and R9 are arranged in series and are connected in parallel with capacitor C2 (i.e., resistors R8 and R9 are connected in series between a node between diode D6 and capacitor C2 and the neutral conductor). The overvoltage signal $V_{ov}$ is produced at the node between resistors R8 and R9 and is supplied to the inverting input of op amp 62.

In addition to the overvoltage signal $V_{ov}$, overvoltage circuit 60 also requires a stable supply voltage ($V_{dd}$) and a stable reference voltage ($V_{ref}$). These voltages are produced by the regulated half wave rectifier circuit comprising: diode D5, resistors R10, R11, and R12, capacitor C3, and Zener diodes ZD1 and ZD2), as shown in FIG. 6. In particular, diode D5, resistor R10, and capacitor C3 are connected in series between the input line and neutral conductors (i.e., series-connected resistor R10 and capacitor C3 are connected in parallel with serially-connected resistors R6 and R7). Diode D5, resistors R11 and R12, and Zener diodes ZD1 and ZD2 are also connected in series between the input line and neutral conductors. Resistor R10 and R11 are connected in parallel (coupled to each other at each end), and resistor R12 and Zener diodes ZD1 and ZD2 are connected in parallel with capacitor C3. The supply voltage $V_{dd}$ is produced at the node between resistor R12 and Zener diode ZD1, and the reference voltage $V_{ref}$ is produced at the node between Zener diodes ZD1 and ZD2. The Zener diodes keep the reference voltage $V_{ref}$ stable across a wide swing of input AC voltages.

An unregulated DC supply is one whose DC voltage depends directly on the AC input voltage (i.e., the supply voltage). A regulated DC supply will maintain its DC output (i.e., regulate its output) very close to a nominal level with variations of the AC input voltage. Both the overvoltage and under-voltage signals ($V_{ov}$ and $V_{uv}$) are unregulated supplies (i.e., the DC voltage varies directly with the supply voltage). These two voltages ($V_{ov}$ and $V_{uv}$) set operational limits (overvoltage and under-voltage levels) and must, therefore, vary with the supply voltage. This is basically achieved using a capacitor across a voltage divider circuit (series combination of resistors connected across the line/neutral pair).

The supply and reference voltages, $V_{dd}$ and $V_{ref}$, must remain constant and are therefore produced by a regulated supply. A regulated supply is similar to an unregulated supply (e.g., comprising resistors, one or more diodes, and one or more capacitors). However, in order to maintain the DC voltage level constant with variations in the supply voltage, some form of regulation is added. In this example, a Zener regulator is used which comprises a current limiting resistor in series with one or more Zener diodes. The voltage across the Zener diode varies only slightly with orders of magnitude changes in the current through the device. As long as some current flows through the Zener diode, the voltage will be regulated. In this design, the Zener voltage changes by only about 1% with a range in supply voltage from 80 Vrms to over 200 Vrms. Stable $V_{dd}$ and $V_{ref}$ levels are required to have a consistent over and under voltage, over-current, and over-temperature cutout level. Other ways of regulating the DC output voltage over a range in AC supply voltage may include pulse width modulation and feedback methods.

The value of reference voltage $V_{ref}$ is determined by the reverse breakdown voltage of Zener diode ZD2, and the value of supply voltage $V_{dd}$ is determined by the combined reverse breakdown voltages of Zener diodes ZD1 and ZD2. Supply voltage $V_{dd}$ and reference voltage $V_{ref}$ are very stable (e.g., close to 15V and 7.5V, respectively) over an 80 Vrms to 240 Vrms range in line voltage. The stable supply voltage $V_{dd}$ is used as the positive power supply of op amp 62, and the negative power supply of op amp 62 is coupled to the neutral conductor. The supply voltage $V_{dd}$ is also connected to the op amp output via a resistor R29. The stable reference voltage $V_{ref}$ is connected to the non-inverting input of op amp 62 via a resistor R21. With this configuration, when the inverting input ($V_{ov}$) is less than the non-inverting input ($V_{ref}$), the op amp output will be high (close to $V_{dd}$), indicating that an overvoltage fault condition does not exist. The output of op amp 62 is coupled to the emitter of bipolar transistor Q3, for example in a wired-AND arrangement with output signals from other condition sensing circuits as described above (see FIG. 5). The reference voltage $V_{ref}$ is supplied to the base of transistor Q3 via a resistor R14, and the hybrid switch control signal is provided at the collector of transistor Q3.

The value of overvoltage signal $V_{ov}$ is determined by resistors R6, R7, R8, and R9 and can be, for example, about 5 Vdc at nominal AC line voltage conditions (i.e., $V_{line}$=120 Vrms). As the line voltage increases, so does the overvoltage signal $V_{ov}$. When the line voltage increases to about 170 Vrms, an abnormal overvoltage condition, overvoltage signal $V_{ov}$ increases to more than 7.5 Vdc, which will cause the op amp output to switch to a low state (close to 0 Vdc with respect to the neutral reference point), thereby indicating an overvoltage fault condition.

One of the problems with prior art designs is they can be prone to on/off switching when the line voltage is close to the designed cut-out level (i.e., small changes in the line voltage can cause the relay to repeatedly switch on and off). This undesirable response can be avoided by designing positive feedback (hysteresis) into the op amp circuit. Positive feedback, as will be explained, is created by connecting the reference voltage $V_{ref}$ to the non-inverting op amp input through a resistor R21 and connecting the non-inverting op amp input to the op amp output via a resistor R22.

Under conditions of nominal line voltage (i.e., 120 Vrms), overvoltage signal $V_{ov}$ will be less than reference voltage $V_{ref}$, and the op amp output will be high ($V_H$). With the output high, a current from the op amp output to the reference voltage $V_{ref}$ will be created with a value given by the following equation:

$$I=(V_H-V_{ref})/(R21+R22)$$

This current will cause the voltage at the non-inverting input to increase to the following amount:

$$V_{+high\ output}=V_{ref}+I*R21=V_{ref}+(V_H-V_{ref})*R21/(R21+R22)$$

In order for op amp 62 to switch to a low output (indicating a fault condition), the voltage at the inverting input (overvoltage signal $V_{ov}$) will have to increase to a value greater than the reference voltage $V_{ref}$ by the following amount:

$$(V_H-V_{ref})*R21/(R21+R22)$$

When the line voltage increases to a level such that overvoltage signal $V_{ov}$ is greater than $V_{+high\ output}$, op amp 62 will switch to a low output ($V_L$). Under these conditions, a current from the reference voltage $V_{ref}$ to the op amp output will be produced with a value given by the following equation:

$$I=(V_{ref}-V_L)/(R21+R22)$$

This current will cause the voltage at the non-inverting input to decrease to the following amount:

$$V_{+low\ output}=V_{ref}-I*R21=V_{ref}-(V_{ref}-V_L)*R21/(R21+R22)$$

In order for op amp 62 to switch back to a high output (indicating no fault condition) requires that the voltage at the inverting input (overvoltage signal $V_{ov}$) decrease to a value less than reference voltage $V_{ref}$ by the following amount:

$$(V_{ref}-V_L)*R21/(R21+R22)$$

The overall hysteresis voltage is given by the difference between the non-inverting voltage with a high op amp output and the non-inverting voltage with a low op amp output:

$$V_{hysteresis} = V_{+high\ output} - V_{+low\ output}$$
$$= (V_H - V_L) * R21 / (R21 + R22)$$

Figure 7:
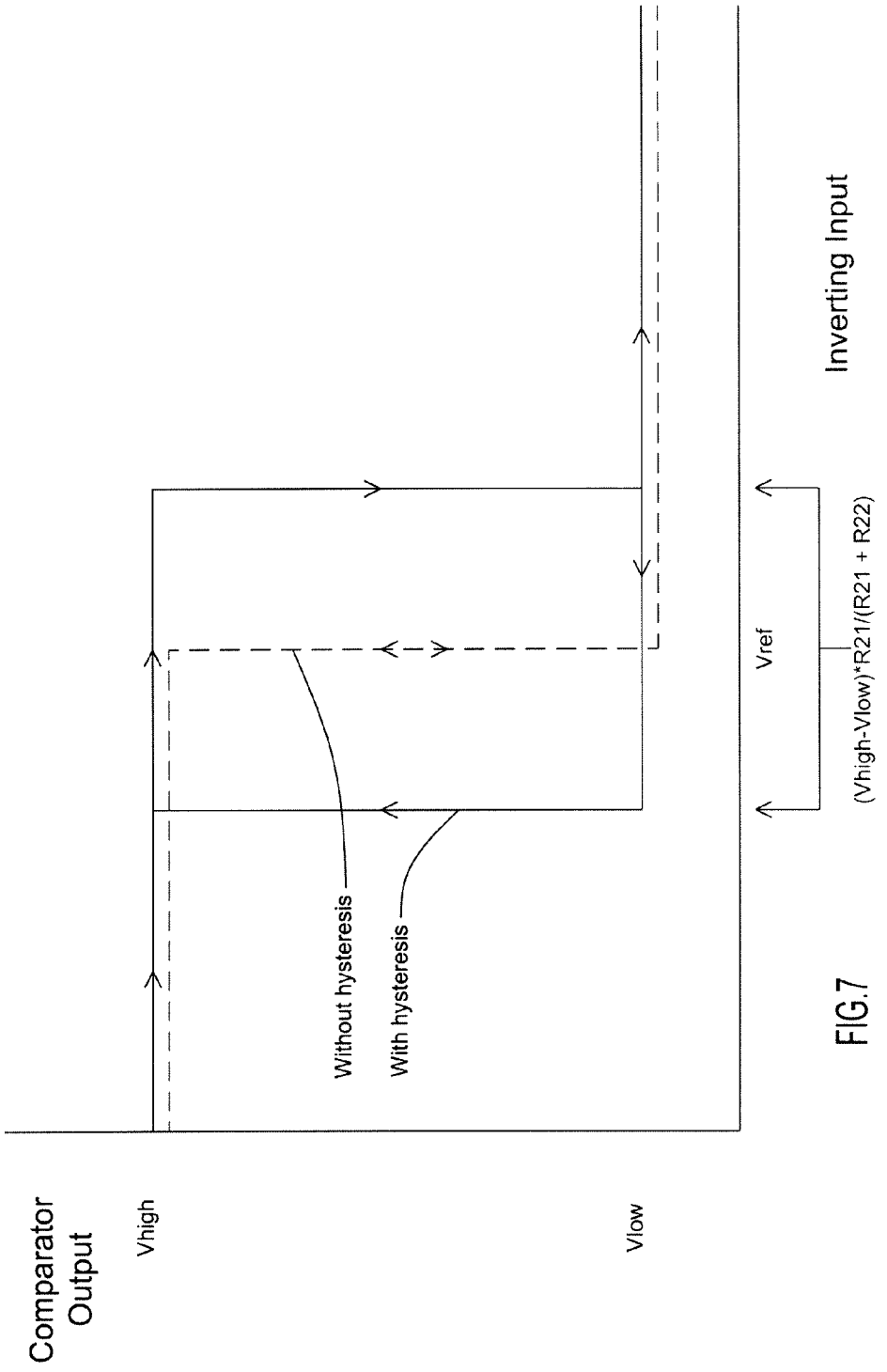
FIG. 7 is a graph of a comparator characteristic (output versus inverting input) with and without hysteresis for a condition sensing circuit employing a comparator operational amplifier.

As can be seen from the above equation, the amount of hysteresis in the circuit can be set by the values of resistors R21 and R22. FIG. 7 shows the switching characteristic of the op amp circuit with and without positive feedback (hysteresis). FIG. 7 shows that, without hysteresis, small changes in the inverting input voltage (overvoltage signal $V_{ov}$) as a result of small changes in line voltage could result in switching of the op amp output (i.e., undesirable op amp output oscillations). With hysteresis, the voltage at the inverting input terminal (and the line voltage) would have to change considerably in order for the comparator output to change, resulting in little risk of op amp output oscillations.

By using an op amp with positive feedback to compare the overvoltage signal with a stable reference voltage, the overvoltage circuit described produces a much more consistent response to overvoltage conditions. The signal produced by the overvoltage circuit (hybrid switch control signal) is used to control the hybrid switch circuit by switching transistor Q4 (FIGS. 3 and 4) on and off. Unlike prior art overvoltage circuits that operate one or more discrete transistors as linear amplifiers, the signal produced by the op amp overvoltage circuit described forces transistor Q4 to act as an on/off switch. Configuring transistor Q4 as an on/off switch results in a much more consistent overvoltage cut-out level over the expected device ambient and component temperature range.

Figure 8:
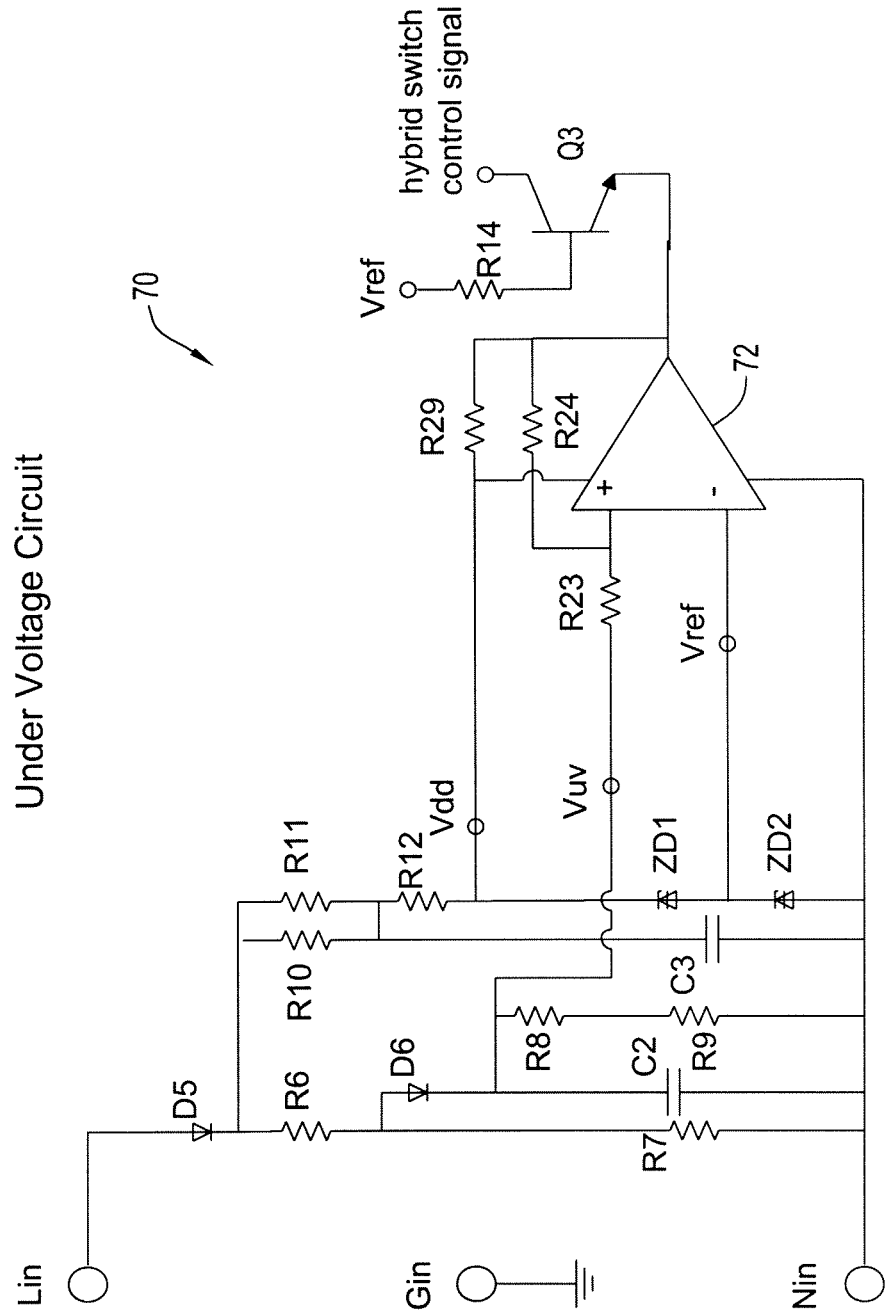
FIG. 8 is a schematic illustration of an embodiment of an under-voltage circuit.

FIG. 8 is a schematic illustration of an embodiment of under-voltage circuit 70 shown conceptually in FIG. 5. Under-voltage circuit 70 can be constructed in a manner similar to overvoltage circuit 60. More specifically, under-voltage circuit 70 can comprise many of the same circuit components as overvoltage circuit 60, including diodes D5 and D6, resistors R6, R7, R8, R9, R10, R11, and R12, capacitors C2 and and Zener diodes ZD1 and ZD2 connected in the manner described above. Under-voltage circuit 70 also includes an operational amplifier 72 configured as a comparator. Like overvoltage circuit 60, under-voltage circuit 70 requires a DC voltage ($V_{uv}$) with an amplitude that is directly proportional to the AC supply voltage. This under-voltage signal $V_{uv}$ can be produced by the same unregulated half-wave power supply circuit that produces overvoltage signal $V_{ov}$. The difference is that under-voltage signal $V_{uv}$ is obtained across capacitor C2, whereas overvoltage signal $V_{ov}$ is obtained across resistor R9 (i.e., a fraction of under-voltage signal $V_{uv}$). That is, as shown in FIG. 8, under-voltage signal $V_{uv}$ is produced at the node between diode D6 and capacitor C2 (or, equivalently, at the node between diode D6 and resistor R8). With nominal line voltage levels (i.e., 120 Vrms), overvoltage signal $V_{ov}$ can be about 5 Vdc and under-voltage signal $V_{uv}$ can be about 10 Vdc. As with overvoltage circuit 60, the supply voltage $V_{dd}$ is supplied to the positive power supply of op amp 72 of under-voltage circuit 70, and the negative power supply of op amp 72 is connected to the neutral conductor. The supply voltage is also connected to the output of op amp 72 via resistor R29. The output of op amp 72 is coupled to the emitter of bipolar transistor Q3, for example in a wired-AND arrangement with the output of overvoltage circuit 60 and outputs of other condition sensing circuits, as shown in FIG. 5.

Another difference between under-voltage circuit 70 and overvoltage circuit 60 is that, in the case of under-voltage circuit 70, the reference voltage $V_{ref}$ is connected directly to the inverting input of op amp 72, and under-voltage signal $V_{uv}$ is connected through a resistor R23 to the non-inverting input of op amp 72 (i.e., the inputs are reversed relative to those of op amp 62 of overvoltage circuit 60). The non-inverting input of op amp 72 is connected to the output of op amp 72 via resistor R24 to provide positive feedback. With this configuration (ignoring hysteresis for the moment), if under-voltage signal $V_{uv}$ is greater than the reference voltage $V_{ref}$ (as it is at nominal line voltage levels), the output of under-voltage op amp 72 will be high, indicating the absence of an under-voltage fault condition. When the AC supply voltage drops to a level such that the under-voltage signal $V_{uv}$ is less than the reference voltage $V_{ref}$ (again ignoring hysteresis), the op amp output will go low, indicating an under-voltage fault condition. Similar to resistors R21 and R22 in overvoltage circuit 60, resistors R23 and R24 provide for hysteresis in under-voltage circuit 70, with the amount of hysteresis controlled by the values of these two resistors.

Figure 9:
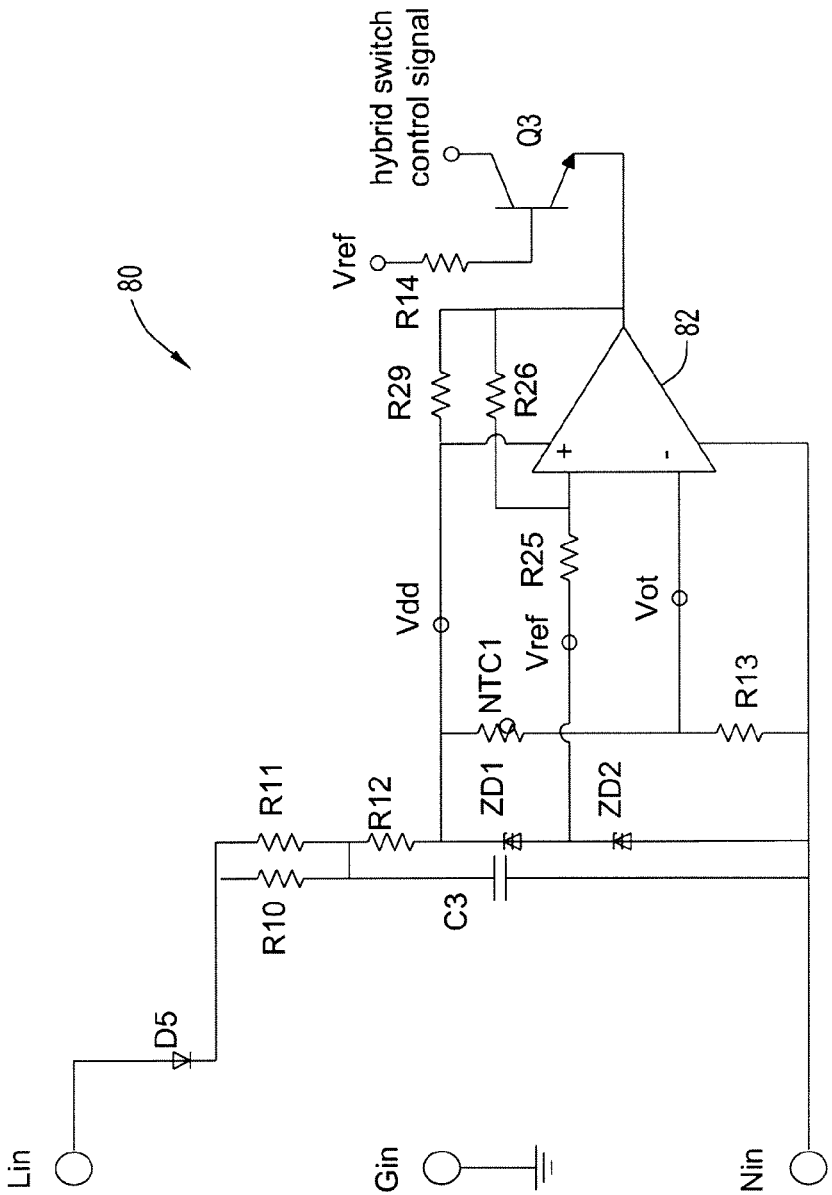
FIG. 9 is a schematic illustration of an embodiment of an over-temperature circuit.

FIG. 9 is a schematic illustration of an embodiment of over-temperature circuit 80 shown conceptually in FIG. 5. Over-temperature circuit 80 employs the same circuitry for generating the reference voltage $V_{ref}$ and the supply voltage $V_{dd}$ as overvoltage circuit 60 and under-voltage circuit 70, specifically, diode D5, resistors R10, R11, and R12, capacitor C3, and Zener diodes ZD1 and ZD2 connected in the manner described above. The reference voltage $V_{ref}$ generated at the node between Zener diodes ZD1 and ZD2 is supplied to the non-inverting input of an op amp 82 via a resistor R25. The non-inverting input of op amp 82 is connected to the output of op amp 82 via resistor R26. Similar to the resistors R21-R24 in overvoltage circuit 60 and under-voltage circuit 70, resistors R25 and R26 create positive feedback and controllable hysteresis in over-temperature circuit 80, with the amount of hysteresis controlled by the values of these two resistors.

As with the op amps of overvoltage circuit 60 and under-voltage circuit 70, the supply voltage $V_{dd}$ is supplied to the positive power supply of op amp 82 of over-temperature circuit 80, the negative power supply of op amp 82 is connected to the neutral conductor, and the supply voltage $V_{dd}$ is connected to the output of op amp 82 via resistor R29. The output of op amp 82 is coupled to the emitter of bipolar transistor Q3, for example in a wired-AND arrangement with the output signals of overvoltage circuit 60 and under-voltage circuit 70.

Over-temperature circuit 80 further includes a negative temperature coefficient resistor NTC1 and a resistor R13 connected in series between the supply voltage $V_{dd}$ and the neutral conductor, thereby forming a voltage divider across supply voltage $V_{dd}$. A DC voltage generated at the node between negative temperature coefficient resistor NTC1 and resistor R13 serves as an over-temperature signal $V_{ot}$, which is supplied to the inverting input of op amp 82. Over-temperature signal $V_{ot}$ has an amplitude that is directly proportional to the ambient temperature in the vicinity of negative temperature coefficient resistor NTC1. With an ambient temperature of 25° C., the resistance of NTC1 will be much higher than resistor R13, and the voltage across resistor R13 ($V_{ot}$) will be significantly lower than the reference voltage $V_{ref}$. Under these conditions, the output of the comparator op amp 82 will be high, indicating the absence of an over-temperature fault condition. When the ambient temperature rises to about 75° C. (an abnormal condition), the resistance of NTC1 will drop to a value less than that of resistor R13, and the voltage across resistor R13 ($V_{ot}$) will be greater than the reference voltage $V_{ref}$. Under these conditions, the output of the comparator op amp 82 will switch to a low state, indicating an over-temperature fault condition.

Figure 10:
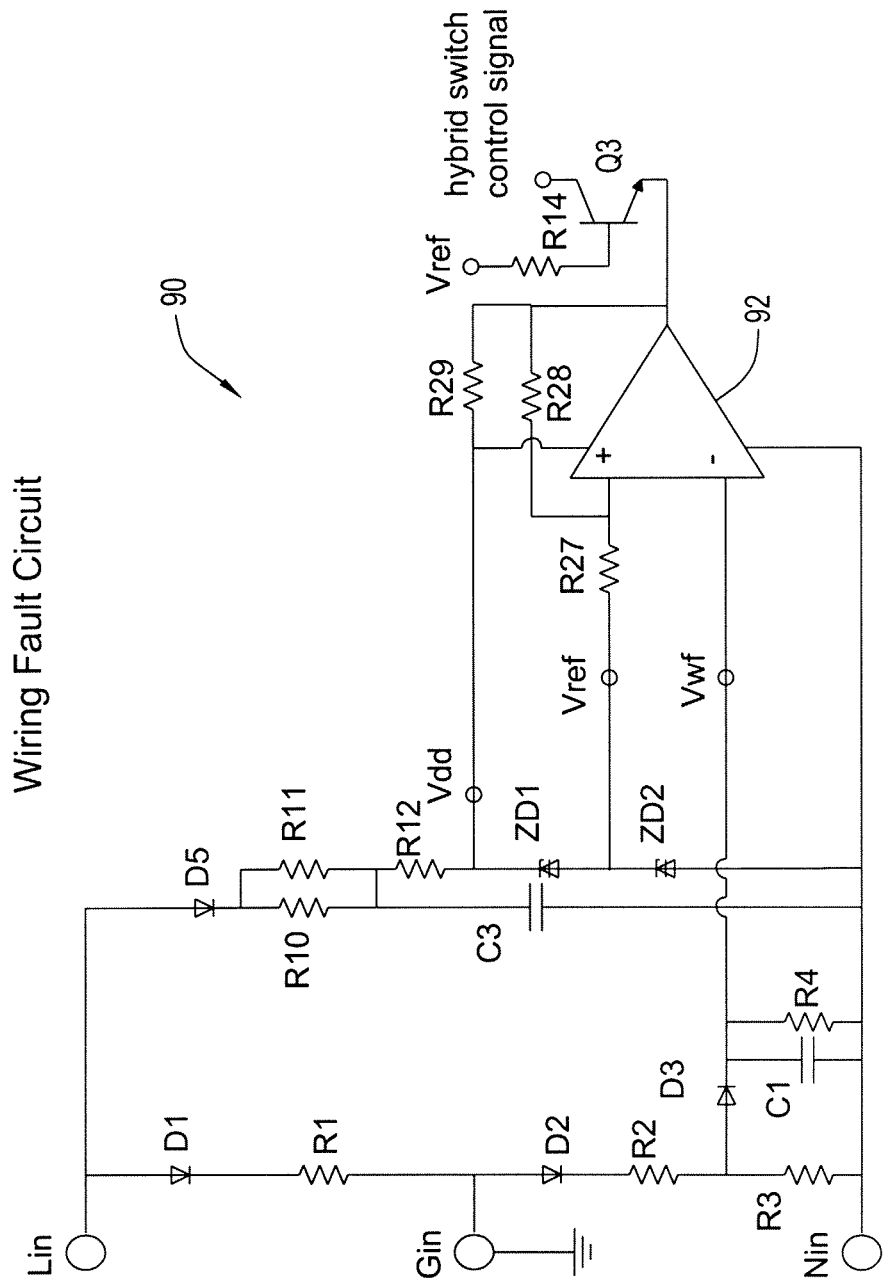
FIG. 10 is a schematic illustration of an embodiment of a wiring fault circuit.

FIG. 10 is a schematic illustration of an embodiment of wiring-fault circuit 90 shown conceptually in FIG. 5. Wiring-fault circuit 90 employs the same circuitry for generating the reference voltage $V_{ref}$ and the supply voltage $V_{dd}$ as overvoltage circuit 60, under-voltage circuit 70, and over-temperature circuit 80, specifically, diode D5, resistors R10, R11, and R12, capacitor C3, and Zener diodes ZD1 and ZD2 connected in the manner described above. The reference voltage $V_{ref}$ generated at the node between Zener diodes ZD1 and ZD2 is supplied to the non-inverting input of an op amp 92 via a resistor R27. The non-inverting input of op amp 92 is connected to the output of op amp 92 via resistor R28. Similar to the resistors R21-R26 in overvoltage circuit 60, under-voltage circuit 70, and over-temperature circuit 80, resistors R27 and R28 create positive feedback and controllable hysteresis in wiring-fault circuit 90, with the amount of hysteresis controlled by the values of these two resistors.

As with the op amps of overvoltage circuit 60, under-voltage circuit 70, and over-temperature circuit 80, the supply voltage $V_{dd}$ is supplied to the positive power supply of op amp 92 of wiring-fault circuit 90, the negative power supply of op amp 92 is connected to the neutral conductor, and the supply voltage $V_{dd}$ is connected to the output of op amp 92 via resistor R29. The output of op amp 92 is coupled to the emitter of bipolar transistor Q3, for example in a wired-AND arrangement with the output signals of overvoltage circuit 60, under-voltage circuit 70, and over-temperature circuit 80 (see FIG. 5).

Wiring-fault circuit 90 uses op amp 92, configured as a comparator, to compare a wiring-fault signal ($V_{wf}$) to the stable reference voltage $V_{ref}$. The wiring-fault signal $V_{wf}$ is created by a line/neutral/ground connected half wave rectifier circuit comprising diodes D1, D2, and D3, resistors R1, R2, R3, R4, and capacitor C1. In particular, diode D1, resistor R1, diode D2, resistor R2, and resistor R3 are connected in series between the input line and neutral conductors. The input ground conductor is coupled to a node between resistor R1 and diode D2. A first terminal of diode D3 is coupled to a node between resistors R2 and R3, and a second terminal of diode D3 supplies the wiring-fault signal $V_{wf}$ to the inverting input of op amp 92. Capacitor C1 and resistor R4 are connected in parallel between the second terminal of diode D3 and the neutral conductor.

With continuity and correct polarity of the supply line, neutral, and ground conductors, the very low steady-state voltage across the neutral/ground pair results in little or no voltage across capacitor C1. As such, the output of the wiring fault comparator op amp 92 will be in a high state, indicating the absence of a wiring fault condition. If continuity of the supply ground conductor is broken, the line voltage across the line/neutral pair will cause capacitor C1 to charge up. With proper selection of resistors R1, R2 and R3, the steady state voltage across capacitor C1 will be greater than the reference voltage $V_{ref}$ and the output of comparator op amp 92 will switch to a low state, indicating a wiring fault condition. The same steady state voltage across capacitor C1 will occur with loss of ground continuity, and reverse polarity (i.e., line and neutral conductors reversed). The wiring fault comparator output, therefore, will be in a low state with the loss of ground continuity regardless of the polarity of the line and neutral of the power supply. With reverse polarity and continuity of the ground conductor, the voltage between the input neutral terminal $N_{in}$ and the input ground terminal $G_{in}$ in the circuit shown in FIG. 10, which is actually the line-to-ground voltage because line and neutral are reversed, will create a steady-state voltage that is also greater than the reference voltage $V_{ref}$. As such, the output of the comparator op amp 92 will be in a low state. Accordingly, wiring fault circuit 90 will signal the following wiring faults: loss of ground continuity (regardless of the polarity of input line and neutral signals); and reverse polarity (regardless of the continuity of ground).

Figure 11:
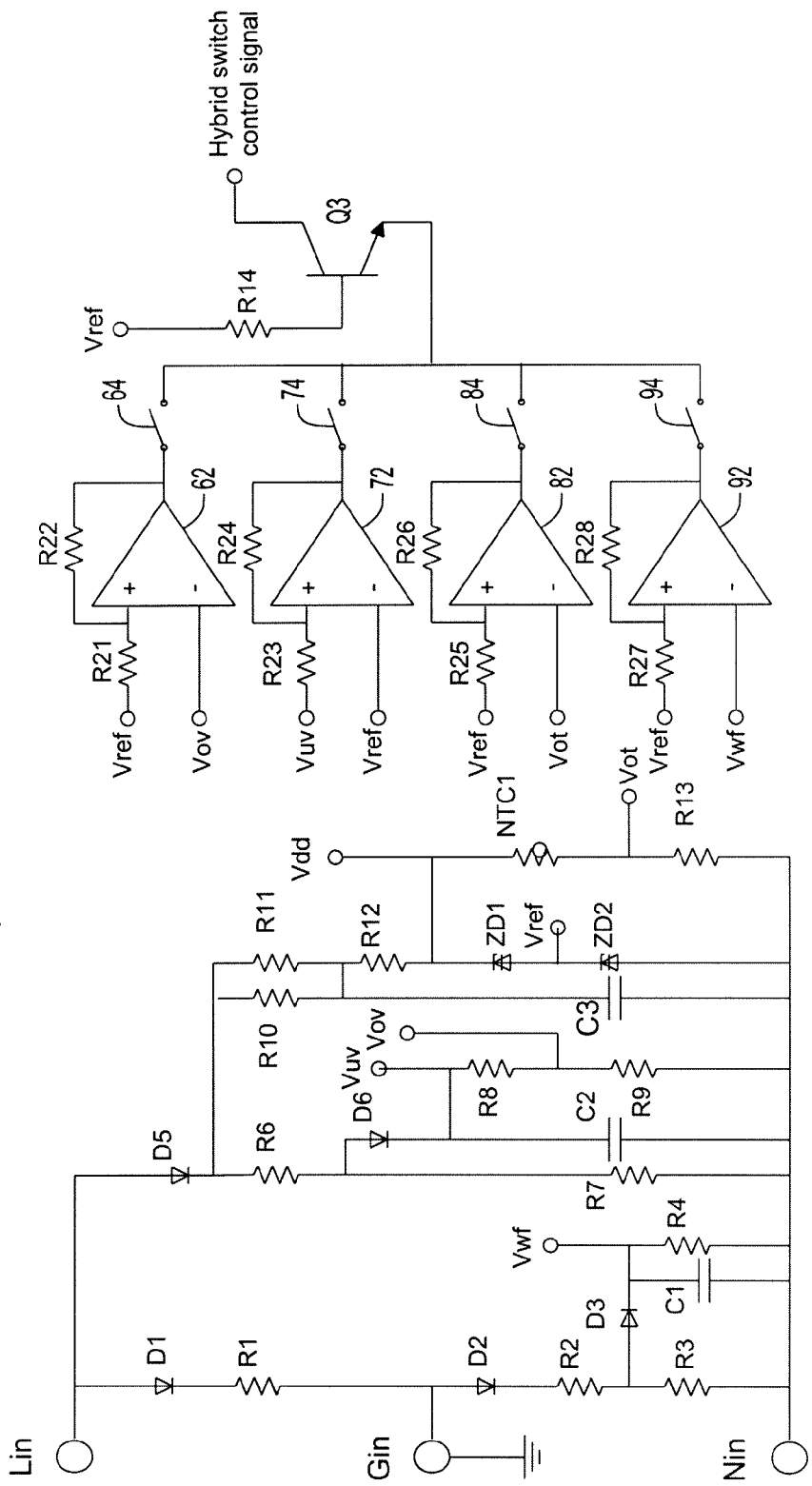
FIG. 11 is a schematic illustration of an embodiment of a multi-function hybrid switch control circuit including a plurality of condition sensing circuits.

FIG. 11 is a schematic illustration of an embodiment of a circuit that combines the overvoltage, under-voltage, over-temperature and wiring-fault circuits into a multi-function hybrid switch control circuit. In particular, diodes D1-D6, resistors R1-R14 and R21-R28, capacitors C1-C3, Zener diodes ZD1 and ZD2, op amps 62, 72, 82, and 92, and transistor Q3 are arranged as described in connection with FIGS. 6 and 8-10, with the overvoltage signal $V_{ov}$, the under-voltage signal $V_{uv}$, the over-temperature signal $V_{ot}$, the wiring fault signal $V_{wf}$, the supply voltage $V_{dd}$, and the reference voltage $V_{ref}$ being generated at various points in the circuit, as previously described. Essentially, the circuit shown in FIG. 11 is one possible implementation of the hybrid switch control circuit shown conceptually in FIG. 5.

In certain applications or with certain equipment, it may not be desirable to have power interrupted for every one of the operating conditions detected by the various condition sensing circuits of the multi-function hybrid switch control circuit. Accordingly, selector switches can be used to include only those condition sensing circuits that are desired. As shown in FIG. 11, selector switches 64, 74, 84, and 94, such as dip switches or jumpers, can be placed, respectively, between the outputs of the overvoltage circuit, under-voltage circuit, over-temperature circuit, and wiring fault circuit and the wired-AND connection to the emitter of transistor Q3. The outputs of individual sensing circuits (i.e., overvoltage, under-voltage, over-temperature and wiring fault circuits) are selected or de-selected for inclusion in the switch control circuit by closing or opening the corresponding selector switch. For example, if the selector switches of only the overvoltage circuit and under-voltage circuit are closed (leaving the selector switches of the over-temperature and wiring fault circuits open), then only an overvoltage condition or under-voltage condition would impact the state of the hybrid switch (an over-temperature fault condition or a wiring fault condition would not factor into the hybrid switch control signal or cause the hybrid switch to open in this case). The selector switches thus provide flexibility by making inclusion of each of the condition detection circuits optional.

Figure 12:
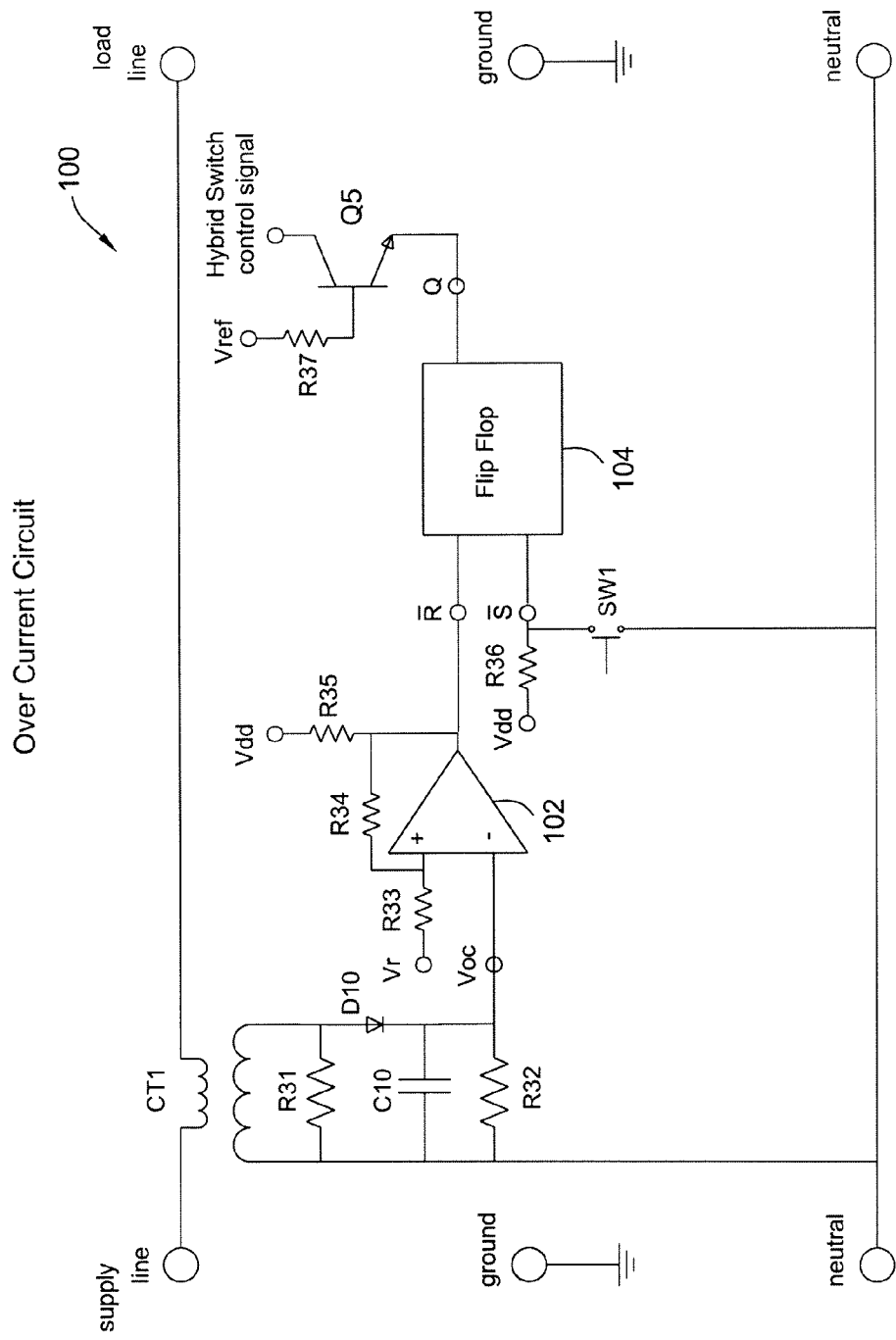
FIG. 12 is a schematic illustration of an embodiment of an over-current circuit.

FIG. 12 is a schematic illustration of an embodiment of an over-current circuit 100. Like overvoltage circuit 60 and the other condition sensing circuits, over-current circuit 100 uses an op amp 102 configured as a comparator with positive feedback for controlled hysteresis. Also like the previously described condition detection circuits, over-current circuit 100 uses op amp 102 to compare a stable reference voltage with a voltage of interest that indicates an operating condition. In the case of over-current circuit 100, the voltage of interest is an over-current signal $V_{oc}$ that is directly proportional to the load current and is generated by a current sense circuit comprising a current transformer CT1, resistors R31 and R32, diode D10, and capacitor C10.

The primary winding of current transformer CT1 is along the input (supply side) line conductor, and the secondary winding is connected on one end to the neutral conductor and on the other end to the inverting input of op amp 102 via diode D10. Resistor R31 is arranged across (in parallel with) the secondary winding of current transformer CT1, and a secondary AC voltage that is proportional to the current in the primary winding (i.e., the supply line conductor) is generated across resistor R31. Resistor R32 and capacitor C10 are connected in parallel between the neutral conductor and the inverting input of op amp 102 and, along with diode D10, form a rectifier circuit. The purpose of the rectifier circuit is to convert the secondary AC voltage (across resistor R31) to a DC level that is then connected to the inverting input of op amp 102. Specifically, the over-current signal $V_{oc}$ is produced at the node connecting diode D10, capacitor C10, resistor R32, and the inverting input of op amp 102.

Because the secondary voltage of the current transformer is relatively low, the stable reference voltage ($V_r$) required for comparison is much lower than the reference voltage $V_{ref}$ used in the other condition detection circuits. The circuit used to generate the reference voltage $V_{ref}$ and the supply voltage $V_{dd}$ can be identical to that used in the other condition sensing circuits. In order to create the low level reference voltage $V_r$, a current limiting resistor and one or two forward diodes can be connected across the $V_{ref}$ Zener diode (Zener diode ZD2 shown in FIGS. 6 and 8-11). The low reference voltage $V_r$ is supplied to the non-inverting input of op amp 102 via a resistor R33. The non-inverting input of op amp 102 is connected to the output of op amp 102 via resistor R34. Similar to the resistors R21-R28 in the condition detection circuits previous described, resistors R33 and R34 create positive feedback and controllable hysteresis in over-current circuit 100, with the amount of hysteresis controlled by the values of these two resistors. As with the op amps of the previously described condition detection circuits, the supply voltage $V_{dd}$ is supplied to the positive power supply of op amp 102 of over-current circuit 100, the negative power supply of op amp 102 is connected to the neutral conductor, and the supply voltage $V_{dd}$ is connected to the output of op amp 102 via a resistor R35. A transistor Q5 generates the hybrid switch control signal at its collector. The base of transistor Q5 is coupled to the reference voltage $V_{ref}$ via a resistor R37.

A significant difference between over-current circuit 100 and the other condition sensing circuits is that the output of the comparator op amp 102 is not connected directly to the emitter of the transistor Q5 that generates the hybrid switch control signal at its collector. Instead, the comparator output is connected through an RS Flip Flop 104, as shown in FIG. 12. This allows for a manual reset, as will be explained.

In response to a predefined over-current condition, the current sense circuit will generate a voltage $V_{oc}$ that is greater than the stable reference voltage $V_r$. When this occurs (ignoring hysteresis), the output of the comparator op amp 102 will switch from a high state to a low state, indicating an over-current fault condition. If the comparator output were connected directly to the emitter of the hybrid switch control signal transistor, the forward bias condition caused by the low comparator output would turn on this transistor. This would pull the hybrid switch control signal low which, in turn, would turn off the transistor in the hybrid switch circuit. With the hybrid switch circuit transistor turned off, the hybrid switch will turn off, thereby disconnecting power to connected equipment. As a result, the load current will drop to zero. With no load current, the output of the current sense circuit would drop to zero and the comparator output would, once again, go high, indicating the absence of an over-current fault condition. The high comparator output would turn off the hybrid switch control signal transistor Q5, turn on the hybrid switch circuit transistor, and turn on the hybrid switch. This would once again pass power to connected equipment which might re-establish the over-current condition. Under these conditions, the over-current circuit would cause the hybrid switch to oscillate on and off. In contrast to the other condition sensing circuits, which generally monitor the AC power supply conditions, this oscillation problem may exist with the over-current circuit, because an over-current condition is typically the result of connected equipment drawing too much current rather than any problem with the AC power supply.

In order to avoid this situation, over-current circuit 100 includes a manual reset circuit comprising RS Flip Flop 104 and a momentary switch (SW1). The output of comparator op amp 102 is supplied to the reset input of flip flop 104, and the supply voltage $V_{dd}$ is connected to the set input of flip flop 104 via a resistor R36. Momentary switch SW1 is connected between the set input and the neutral conductor. In response to an over-current condition, the comparator op amp output will go low, as previously described. Instead of being directly connected to the emitter of the hybrid switch control signal transistor, the comparator output is connected to the reset input of the RS Flip Flop (cross coupled NAND gates). With a low signal at the reset input, the Q output of flip flop 104 will go to a low state. This will turn on the hybrid switch control signal transistor and turn off the hybrid switch circuit transistor, thereby turning off the hybrid switch and connected equipment.

With the connected equipment off, load current drops to zero and the comparator op amp output, once again, goes high. With a high input to both the set and reset inputs, the flip flop output will remain in its previous state (i.e., low output). Resetting the flip flop output (i.e., change to a high level) requires a low level at the set input. A low input to the set input requires that momentary switch (SW1) be closed. When the momentary switch (SW1) is closed, the set input is pulled to the reference level (low level) and the flip flop output will once again go high. This will turn off the hybrid switch control signal transistor which, in turn, will turn on both the hybrid switch transistor and hybrid switch. If the over-current condition is corrected before resetting the over-current circuit (e.g., faulty equipment was either disconnected or repaired), then the comparator output and reset input will be high. Once the momentary switch is released (allowed to open), the set input will return to a high level. With high inputs to both the set and reset inputs, the flip flop output will remain in its previous state (i.e., high output). This high flip flop output will keep the hybrid switch control signal transistor turned off which, in turn will keep the hybrid switch circuit transistor and hybrid switch turned on (continues to pass power to connected equipment).

If the over-current condition wasn't corrected, then closing the momentary switch will temporarily set the flip flop output high (temporarily turning on the hybrid switch). In this case, however, reconnecting the equipment will re-establish the over-current condition, which will cause the comparator output and reset input to go low which will reset the flip flop output low, thereby turning off the hybrid switch.

The manual reset circuit, therefore, requires that the momentary switch be briefly closed in order to pass power to connected equipment after the hybrid switch has opened in response to an over-current condition. Much like the operation of a thermal or magnetic circuit breaker, this gives the equipment operator the opportunity to make the necessary equipment/system adjustments required to reduce the load current to nominal levels (i.e., eliminate the over-current condition).

While described herein in the context of generating a signal to control a hybrid switch, it will be appreciated that the switch control circuits shown in FIGS. 6 and 8-12 can be used to control any type of switching device or circuit or can be used simply to provide an indication of a fault condition, particularly where a stable, temperature-insensitive fault condition indicator would be beneficial.

Figure 13:
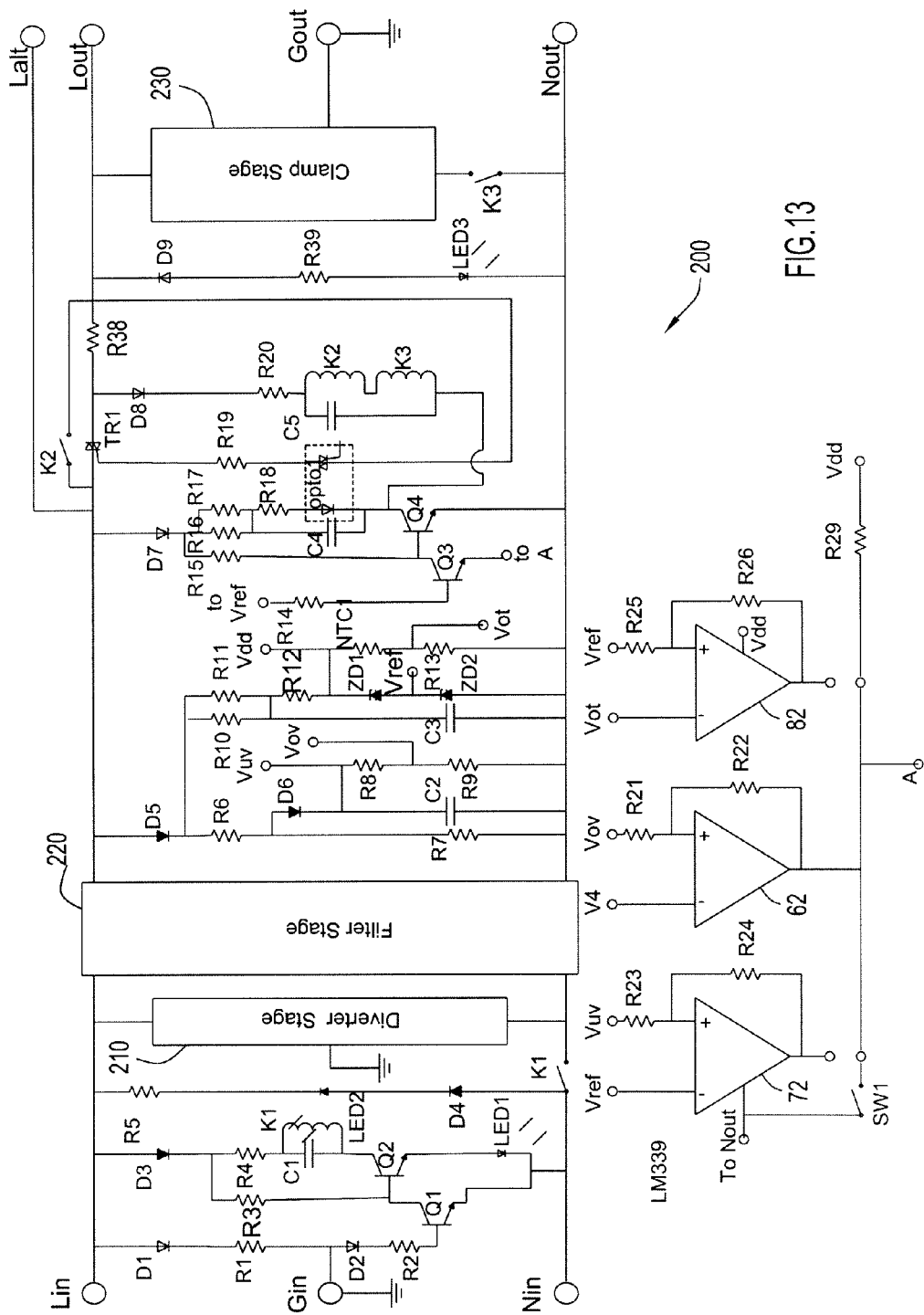
FIG. 13 is a diagrammatic illustration of an embodiment of the power filter circuit including a hybrid switch circuit and a hybrid switch control circuit.

FIG. 13 illustrates a complete power filter circuit 200 which includes the hybrid switch and hybrid switch control circuit in conjunction with other power filtering circuitry. A diverter stage 210 is connected to the input line, neutral, and ground conductors, followed by a filter stage 220 connected between the input line and neutral conductors (i.e., upstream of the hybrid switch). These stages function to suppress voltage transients and EMI/RFI disturbances. A clamp stage 230 connected to the output line, neutral, and ground conductors is located downstream of the hybrid switch circuit and serves to eliminate any residual voltage transients prior to passing the filtered power to the connected equipment. The relay control circuit that controls the state of the hybrid switch relay K2 can also control the state of a relay K3 that connects and disconnects the clamp stage to and from the neutral conductor in unison with relay K2 to protect components of clamp stage 230. Diverter stage 210, filter stage 220, and clamp stage 230 can be similar to those disclosed in U.S. Pat. No. 5,136,455, for example.

In the embodiment shown in FIG. 13, power filter circuit 200 includes an overvoltage circuit, an under-voltage circuit, and an over-temperature circuit like those shown in FIGS. 6, 8, 9, and 11, which control the hybrid switch circuit configured in the manner shown in FIG. 4. The wiring fault circuit shown in FIGS. 10 and 11 can also be incorporated into a power filter circuit. However, in the example shown in FIG. 13, the wiring fault circuit is implemented separately in a circuit upstream of the diverter stage 210 and controls a separate relay between input and output neutral conductors. In particular, the wiring fault circuit, which is similar to that described in U.S. Pat. No. 6,947,266 B1, includes diodes D1, D2, and D3, resistors R1, R2, R3, and R4, an electro-mechanical relay K1, a capacitor C1, transistors Q1 and Q2, and indicator LED (LED1). Diode D1 and resistor R1 are connected in series between the input line conductor and ground. Diode D2 and resistor R2 are connected in series between ground and the base of transistor Q1. Diode D3 and resistor R3 are connected in series between the input line conductor and the base of transistor Q2, which is connected to the collector of transistor Q1. Diode D3, resistor R4, and capacitor C1 are connected in series between the input line conductor and the collector of transistor Q2. The relay coil of relay K1 is connected in parallel with capacitor C1. Resistor R5, indicator LED2, and diode D4 are connected in series between the input line and neutral conductors. The emitter of transistor Q1 is connected directly to the neutral conductor and the emitter of Q2 is connected to the input neutral conductor via indicator LED1. The contacts of relay K1 selectively connect the input neutral conductor to the output neutral conductor upstream of diverter and filter stages 210 and 220.

The wiring fault circuit shown in FIG. 13 passes power to connected equipment only under conditions of normal polarity and continuity of AC ground. In addition, under these correct wiring conditions, the circuit also illuminates LED1. Under conditions of normal polarity and continuity of AC ground, there will be little or no steady-state voltage across the neutral-to-ground pair. Under these conditions, transistor Q1 is off, transistor Q2 is on and a DC voltage is produced across the electro-mechanical relay coil K1. This causes the relay contact K1 to close, which passes power to the diverter and filter stages, the hybrid switch circuit, and connected equipment. In addition to passing power under conditions of normal polarity and continuity of AC ground, the circuit also illuminates LED1.

Under conditions of reverse polarity (reversal of the AC supply line and neutral conductors), the 120 Vrms that exists, under this condition, between neutral and ground will cause transistor Q1 to turn on which, in turn, will turn off transistor Q2. This will remove the DC voltage across the relay coil K1 which will cause relay contact K1 to open, thereby disconnecting power to the diverter and filter stages, the hybrid switch circuit, and connected equipment. In addition to disconnecting power to downstream circuits and connected equipment, the circuit also turns off LED1.

Under conditions of loss of AC ground continuity, the 120 Vrms across the line/neutral pair creates transistor Q1 base drive through the circuit of diode D1, resistor R1, diode D2, and resistor R2, which turns on transistor Q1 and turns off transistor Q2 and relay K1. In addition to removing power to the connected equipment under these conditions, the circuit also turns off LED1. LED1 is also off with loss of continuity of the line and/or neutral.

Indicator LED2 provides a safety function and operates only to indicate the presence of line voltage. Accordingly, LED2 is green when there is AC voltage across the line/neutral pair, and will also be green with loss of ground and/or reverse polarity. LED2 is off when there is no AC voltage across the line/neutral pair (e.g., as a result of loss of continuity of line and/or neutral or a power outage).

A diode D9, a resistor R39, and a third diagnostic indicator LED3 are connected in series between the $L_{out}$ output connection and the neutral conductor. Indicator LED3 is green when the hybrid switch is on. In the circuit of FIG. 13, this occurs when: the supply is wired correctly and relay K1 is closed; the line voltage is nominal (i.e., no overvoltage or under-voltage condition); and when the ambient temperature is below about 70° C. (i.e., no over-temperature condition).

As previously described, the hybrid switch makes or breaks continuity of the line conductor with the connected equipment on the load side depending on whether one of the undesirable operating conditions have been detected (e.g., an overvoltage condition, an under-voltage, an over-temperature condition, an over-current condition, etc.). For equipment that is susceptible to overvoltage conditions, for example, this technique can protect connected equipment from overvoltage related damage. Some types of equipment, however, are not susceptible to overvoltage conditions (e.g., power supplies designed to automatically switch and function with supply voltages as high as 240 Vrms). For this type of equipment, disconnecting power in response to overvoltage conditions is not only unnecessary but, for equipment that is a critical part of business functions, may be a costly nuisance.

In prior art designs, the nuisance of make/break connections in power filter systems can be exacerbated by the variation in overvoltage cut-out level with changes in ambient and component temperature. As ambient and component temperatures in prior art designs go up, the overvoltage cut-out level typically drops. Testing of one such design shows a drop in overvoltage cut-out level from about 150 Vrms to about 135 Vrms after the device is run at full-rated load for 1 hour. Because the number of overvoltage conditions in the 135 Vrms range is typically orders of magnitude higher than those in the 150 Vrms range, prior art designs that suffer from temperature related variations in over-voltage cut-out level can cause significant nuisance tripping of connected equipment.

These problems are reduced or avoided in the hybrid switch control circuit described herein by maintaining consistent switching levels using a stable reference voltage and comparator, as previously described, and by using selector switches (e.g., DIP switches or jumper positions), as previously described, to enable the selection/de-selection of the optional condition sensing circuits, so that the hybrid switch control circuit can be customized to equipment specific requirements.

To allow for further flexibility, the power filter circuit 200 shown in FIG. 13 includes two output connections. The output line conductor, which is downstream (load side) of the hybrid switch, terminates at the output connection $L_{out}$. With equipment connected to this output, when the hybrid switch is turned off by the hybrid switch control circuit, power will be disconnected to connected equipment. For equipment that is susceptible to overvoltage conditions, for instance, this connection can protect such equipment from overvoltage related disruption and damage.

An alternate output connection, the $L_{alt}$ output connection, is coupled to the input line conductor on the supply side of the hybrid switch and bypasses the hybrid switch. Equipment that is not susceptible to overvoltage related disruption or damage (or other types of fault conditions detectable by the hybrid switch control circuit) can be connected to this output to avoid downtime as a result of an overvoltage condition (or other fault conditions). In response to an overvoltage condition, for example, the hybrid switch control circuit will turn off the hybrid switch, thereby protecting downstream device components (including clamp stage components) but will not disconnect power to the $L_{alt}$ output connection. By including the optional output connections shown in FIG. 13, the power filter circuit includes the necessary protection for the clamp stage components, while providing the flexibility for optimal protection of a wider variety of equipment.

While not shown in FIG. 13, the over-current circuit shown in FIG. 12 can also be incorporated into the control circuitry for the hybrid switch circuit in a power filter circuit. However, due to the manual reset mechanism of the over-current circuit (which prevents on/off oscillation of the hybrid switch during ongoing over-current conditions), it is not desirable to incorporate the over-current circuit output with the outputs of the other condition sensing circuits in a wired-AND configuration, since an automatic re-connect is preferable for the other condition sensing circuits. To combine the over-current circuit with the other condition sensing circuits within the overall control circuitry for the hybrid switch circuit, a separate hybrid switch control signal transistor can be employed.

As will be appreciated from the circuit arrangement shown in FIG. 13, in order for an over-current circuit to operate properly, the connected equipment would need to be connected on the load side of the hybrid switch (i.e., to the $L_{out}$ terminal and not the $L_{alt}$ terminal). An over-current condition caused by equipment connected to the alternate output $L_{alt}$ drawing too much current would cause the over-current circuit to turn-off the hybrid switch; however, the over-current condition would persist, since the equipment causing the problem would remain connected.

Having described preferred embodiments of new and improved hybrid switch circuit, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A hybrid switch circuit for coupling an AC power supply to a load, comprising:
   a hybrid switch coupling an input conductor configured to be connected to the AC power supply to an output conductor configured to be connected to the load, the hybrid switch comprising:
      a power semiconductor switchable between on and off states in accordance with a power semiconductor control current, wherein, in the on state, the power semiconductor provides a conductive path for an AC current from the AC power supply between the input and output conductors and, in the off state, the conductive path provided by the power semiconductor is opened; and
      a relay having contacts in a conductive bypass path connected in parallel with the power semiconductor, the contacts being controllable between open and closed states in accordance with a relay control current taken from an output terminal of the power semiconductor, wherein, in the closed state, the relay provides a conductive bypass path between the input and output conductors that bypasses the power semiconductor; and
   a control circuit configured to switch the hybrid switch from a non-conductive state to a conductive state by switching the power semiconductor into the on state in response to flow of the power semiconductor control current and subsequently closing the relay in response to flow of the relay control current.

2. The hybrid switch circuit of claim 1, wherein the control circuit is configured to switch the power semiconductor into the on state at zero-voltage crossings of an AC voltage of the AC power supply.

3. The hybrid switch of claim 1, wherein the control circuit comprises:
   a pair of control conductors terminating in a common connection to carry the power semiconductor control current electrically in parallel with the relay control current; and
   a current switch electrically connected to the common connection to provide a current flow path to a neutral conductor of the AC power supply for both the power semiconductor control current and the relay control current when the current switch is in a conducting state, wherein the relay control current is provided from output current of the power semiconductor when the power semiconductor is switched into the on state by the power semiconductor control current.

4. The hybrid switch of claim 3, wherein each control conductor is coupled to corresponding circuit elements that define time constants such that, in response to the current switch being switch into the non-conducting state, the relay control current decays over a smaller time interval than that over which the power semiconductor control current decays.

5. The hybrid switch circuit of claim 1, wherein the control circuit comprises:
   a switching device control circuit coupled to the input conductor on a supply side of the hybrid switch, the switching device control circuit being configured to switch the power semiconductor into the on and off states in accordance with a state of the flow of the power semiconductor control current in response to a hybrid switch control signal; and
   a relay control circuit coupled to the output terminal of the power semiconductor, the relay control circuit being configured to open and close the relay in accordance with a state of the flow of the relay control current in response to the hybrid switch control signal.

6. The hybrid switch circuit of claim 5, wherein, in response to the hybrid switch control signal being in an off state, the hybrid switch transitions from the conductive state to the non-conductive state by causing the relay control current to decay in the relay control circuit in accordance with a first time constant to open the relay and causing the power semiconductor control current to decay in the switching device control circuit in accordance with a second time constant to switch the power semiconductor into the off state, wherein the second time constant is greater than the first time constant.

7. The hybrid switch circuit of claim 1, further comprising:
at least one condition sensing circuit configured to detect at least one fault condition and to generate a hybrid switch control signal in a state indicative of whether the fault condition exists, the control circuit controlling the hybrid switch to be in the conductive or non-conductive state in accordance with the state of the hybrid switch control signal.

8. The hybrid switch circuit of claim 7, wherein the at least one condition sensing circuit comprises a plurality of condition sensing circuits whose outputs are connected in a wired-AND configuration to generate the hybrid switch control signal.

9. The hybrid switch circuit of claim 7, wherein the at least one condition sensing circuit comprises one or more of: an overvoltage circuit, an under-voltage circuit, an over-temperature circuit, a wiring fault circuit, and an over-current circuit.

10. The hybrid switch circuit of claim 7, wherein the at least one condition sensing circuit comprises:
a regulated half wave rectifier circuit configured to generate a stable reference voltage; and
an operational amplifier including first and second inputs, wherein the stable reference voltage is coupled to one of the first and second inputs, and a signal indicating an operating condition is coupled to the other of the first and second inputs, wherein an output of the operational amplifier indicates whether the fault condition exists based on a comparison of the stable reference voltage and the signal indicating the operating condition.

11. The hybrid switch circuit of claim 10, further comprising:
a first resistor coupling either the stable reference voltage or the signal indicating the operating condition to the first input of the operational amplifier; and
a second resistor coupling the first input of the operational amplifier to the output of the operational amplifier, wherein the first and second resistors cause the operational amplifier to operate with hysteresis in comparing the stable reference voltage to the signal indicating the operating condition.

12. A method of selectively connecting an AC power supply to a load by controlling a hybrid switch comprising at least one power semiconductor arranged in parallel with an electromagnetic relay, the method comprising:
switching a current switch into a conducting state in response to a hybrid switch control signal indicating an absence of a fault condition;
switching on the power semiconductor at a zero-voltage crossing of an AC voltage in an input conductor in response to the current switch being switched into the conducting state to provide thereby a conductive path for an AC current between the input conductor and an output conductor connected to the load; and
providing a portion of output current of the power semiconductor to drive the electromagnetic relay closed in response to the current switch being switched into the conducting state to provide thereby a conductive bypass path between the input and output conductors that bypasses the power semiconductor.

13. The method of claim 12, further comprising:
switching the current switch into a non-conducting state in response to the hybrid switch control signal indicating the fault condition;
opening the electromagnetic relay after a first time interval established in accordance with a first time constant in response to the current switch being switched into the non-conducting state; and
switching off the power semiconductor at a zero crossing of a load current after a second time interval established in accordance with a second time constant in response to the current switch being switched into the non-conducting state, wherein the second time interval is greater than the first time interval.

14. The method of claim 12, further comprising:
generating the hybrid switch control signal by comparing a signal indicating an operating condition to a reference voltage using an operational amplifier.

15. The method of claim 12, further comprising:
generating the hybrid switch control signal from outputs of a plurality of condition sensing circuits that are connected in a wired-AND configuration.

16. The method of claim 12, further comprising:
generating the hybrid switch control signal with a hybrid switch control circuit that detects at least one of the following fault conditions: an overvoltage condition, an under-voltage condition, an over-temperature condition, a wiring fault condition, and an over-current condition.

17. A switch control circuit to control a switch that connects and disconnects an AC power supply to and from a load, the switch control circuit comprising:
a reference voltage generator circuit configured to generate a stable DC reference voltage from an AC power signal provided by the AC power supply; and
a plurality of condition sensing circuits configured to detect the presence or absence of respective fault conditions and to generate a switch control signal indicative of the presence or absence of any one of the fault conditions, wherein each of the condition sensing circuits comprises:
sensing circuitry configured to generate a signal indicating an operating condition by which a corresponding one of the fault conditions can be determined, the sensing circuitry being connected between line and neutral conductors of the AC power supply configured to receive the AC power signal; and
an operational amplifier configured as a comparator and including first and second inputs and an output, wherein the stable reference voltage is coupled to one of the first and second inputs, the signal indicating the operating condition is coupled to the other of the first and second inputs, and the output generates the switch control signal indicative of whether the fault condition exists based on a comparison of the stable reference voltage and the signal indicating the operating condition.

18. The switch control circuit of claim 17, wherein the outputs of the condition sensing circuits are connected in a wired-AND configuration to produce the switch control signal.

19. The switch control circuit of claim 18, further comprising:
a plurality of select/deselect switches that respectively couple the outputs of the plurality of condition sensing circuits to the wired-AND configuration, wherein states of the select/deselect switches are configurable to select which of the condition sensing circuits contribute to a state of the switch control signal.

20. The switch control circuit of claim 17, wherein the condition sensing circuits comprise at least two of: an over-voltage circuit, an under-voltage circuit, an over-temperature circuit, a wiring fault circuit, and an over-current circuit.

21. The switch control circuit of claim 17, wherein the reference voltage generator circuit comprises first and second Zener diodes connected in series between a first node and the neutral conductor, wherein the stable reference voltage is generated at a second node between the first and second Zener diodes and a supply voltage for the operational amplifier is generated at the first node.

22. The switch control circuit of claim 17, further comprising:
a first resistor coupling either the stable reference voltage or the signal indicating the operating condition to the first input of the operational amplifier; and
a second resistor coupling the first input of the operational amplifier to the output of the operational amplifier, wherein the first and second resistors cause the operational amplifier to operate with hysteresis in comparing the stable reference voltage with the signal indicating the operating condition.

23. A power filter circuit, comprising:
at least one power filter stage configured to suppress disturbances in an AC power supply;
a hybrid switch coupling an input conductor configured to be connected to the AC power supply to an output conductor configured to be connected to a load, the hybrid switch comprising:
a power semiconductor switchable between on and off states in accordance with a power semiconductor control current, wherein, in the on state, the power semiconductor provides a conductive path for an AC current between the input and output conductors and, in the off state, the conductive path provided by the power semiconductor is opened; and
a relay having contacts in a conductive bypass path connected in parallel with the power semiconductor, the contacts being controllable between open and closed states in accordance with a relay control current, wherein, in the closed state, the relay closes the conductive bypass path between the input and output conductors that bypasses the power semiconductor; and
a hybrid switch control circuit comprising:
at least one condition sensing circuit configured to generate a hybrid switch control signal whose state indicates whether an operating condition constitutes a fault condition, wherein the hybrid switch control circuit is configured to switch on the power semiconductor into the on state at a zero-voltage crossing of the AC voltage and, subsequently, the power semiconductor provides the relay control current to close the electromagnetic relay.

24. The power filter circuit of claim 23, further comprising:
an alternate output conductor configured to be connected to the load, the alternate output conductor being coupled to the input conductor on an input side of the hybrid switch, thereby bypassing the hybrid switch.

25. The power filter circuit of claim 23, wherein the at least one power filter stage includes at least one of: a diverter stage, a filter stage, and a clamp stage, the at least one power filter stage being configured to suppress at least one of: voltage transients, electromagnetic interference (EMI), and radio frequency interference (RFI).

26. The hybrid switch circuit of claim 3, wherein the control circuit is further configured to switch the hybrid switch from the conductive state to the non-conductive state by switching the current switch into a non-conducting state, responsive to which the relay control current decays in accordance with a first time constant to open the relay and the power semiconductor control current decays in accordance with a second time constant to switch the power semiconductor into the off state, wherein the second time constant is greater than the first time constant.

27. The hybrid switch circuit of claim 26, wherein the control circuit is configured to switch the power semiconductor into the off state at zero crossing of the AC current.

28. The hybrid switch of claim 5, wherein the switching device control circuit includes:
a first circuit coupled to the corresponding one of the control conductors in which the power semiconductor flows when the current switch is in the conducting state; and
a second circuit coupled to a gate of the power semiconductor to generate a gate voltage that switches the power semiconductor into the on and off states, wherein the second circuit is optically coupled to the first circuit.

29. The power filter circuit of claim 23, wherein the hybrid switch control circuit comprises:
a pair of control conductors terminating in a common connection to respectively carry the power semiconductor control current and the relay control current; and
a current switch electrically connected to the common connection to provide a conductive path to a neutral conductor of the AC power supply for both the power semiconductor control current and the relay control current when the current switch is in a conducting state and by which both the power semiconductor control current and the relay control current cease to flow when the current switch is in a non-conducting state.

* * * * *